(12) United States Patent
Sellers et al.

(10) Patent No.: US 7,462,222 B2
(45) Date of Patent: Dec. 9, 2008

(54) FILTER SERVICE SYSTEM

(75) Inventors: Cheryl L. Sellers, Peoria, IL (US);
Daniel S. Nordyke, Arlington Heights, IL (US); Richard A. Crandell, Morton, IL (US); Gregory Tomlins, Peoria, IL (US); Dong Fei, Peoria, IL (US); Alexander Panov, Dunlap, IL (US); William H. Lane, Chillicothe, IL (US); Craig F. Habeger, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 147 days.

(21) Appl. No.: 10/958,226

(22) Filed: Oct. 5, 2004

(65) Prior Publication Data

US 2006/0070359 A1     Apr. 6, 2006

(51) Int. Cl.
*B01D 41/04* (2006.01)
(52) U.S. Cl. .............................. 95/279; 55/294; 55/302; 55/303; 55/DIG. 30; 95/280
(58) Field of Classification Search ............ 55/302, 55/303, 282, 301, 305, 291, 294, 283, 282.1–282.5, 55/466, DIG. 30, 290; 95/278–280, 284; 60/310, 317
See application file for complete search history.

(56) References Cited

U.S. PATENT DOCUMENTS

| | | | | |
|---|---|---|---|---|
| 3,053,031 A | * | 9/1962 | Vedder et al. | 55/292 |
| 3,798,878 A | * | 3/1974 | Pausch | 95/280 |
| 3,887,341 A | | 6/1975 | Sutter | |
| 3,954,426 A | * | 5/1976 | Brange | 95/280 |
| 3,983,036 A | | 9/1976 | Lauzeral et al. | |
| 4,201,556 A | * | 5/1980 | Olsson | 55/292 |
| 4,509,340 A | | 4/1985 | Mullally et al. | |
| 4,514,642 A | | 4/1985 | Ross | |
| 4,516,990 A | | 5/1985 | Erdmannsdörfer et al. | |
| 4,525,183 A | | 6/1985 | Cordes et al. | |
| 4,527,393 A | | 7/1985 | Young | |
| 4,550,570 A | | 11/1985 | Trage et al. | |
| 4,580,401 A | | 4/1986 | Ruscheweyh | |
| 4,582,077 A | | 4/1986 | Gabriel et al. | |
| 4,690,207 A | | 9/1987 | Trage et al. | |

(Continued)

FOREIGN PATENT DOCUMENTS

EP     0 230 140 A1     7/1987

(Continued)

OTHER PUBLICATIONS

Cleaire, Filter Cleaning System Document (1 page), publication date unknown.

(Continued)

*Primary Examiner*—Duane Smith
*Assistant Examiner*—Robert A Clemente
(74) *Attorney, Agent, or Firm*—Finnegan, Henderson, Farabow, Garrett & Dunner

(57) ABSTRACT

According to an exemplary embodiment of the present disclosure, a system for removing matter from a filtering device includes a gas pressurization assembly. An element of the assembly is removably attachable to a first orifice of the filtering device. The system also includes a vacuum source fluidly connected to a second orifice of the filtering device.

54 Claims, 15 Drawing Sheets

U.S. PATENT DOCUMENTS

| | | | |
|---|---|---|---|
| 4,777,798 A | 10/1988 | Jacobson et al. | |
| 4,833,833 A | 5/1989 | Rhodes | |
| 4,833,883 A | 5/1989 | Oda et al. | |
| 4,864,821 A | 9/1989 | Hoch | |
| 4,866,932 A | 9/1989 | Morita et al. | |
| 4,875,335 A | 10/1989 | Arai et al. | |
| 4,875,336 A | 10/1989 | Hayashi et al. | |
| 4,898,599 A | 2/1990 | Settlemyer | |
| 4,909,037 A | 3/1990 | Hubby | |
| 4,940,470 A | 7/1990 | Jaisinghani et al. | |
| 5,019,142 A | 5/1991 | Waschkuttis | |
| 5,039,347 A | 8/1991 | Hindstrom et al. | |
| 5,039,425 A | 8/1991 | Caris et al. | |
| 5,062,965 A | 11/1991 | Bernou et al. | |
| 5,123,243 A | 6/1992 | Baddour | |
| 5,129,920 A | 7/1992 | Albers et al. | |
| 5,151,186 A | 9/1992 | Yoo et al. | |
| 5,203,889 A | 4/1993 | Brown | |
| 5,212,948 A | 5/1993 | Gillingham et al. | |
| 5,253,476 A | 10/1993 | Levendis et al. | |
| 5,254,114 A | 10/1993 | Reed, Jr. et al. | |
| 5,254,144 A | 10/1993 | Provol | |
| 5,350,442 A | 9/1994 | Thelen et al. | |
| 5,390,492 A | 2/1995 | Levendis | |
| 5,397,550 A * | 3/1995 | Marino, Jr. | 422/178 |
| 5,426,936 A * | 6/1995 | Levendis et al. | 60/278 |
| 5,444,892 A | 8/1995 | Ris et al. | |
| 5,497,621 A | 3/1996 | Mallett | |
| 5,560,209 A | 10/1996 | Kienbock et al. | |
| 5,566,545 A | 10/1996 | Hijikata et al. | |
| 5,591,338 A | 1/1997 | Pruette et al. | |
| 5,592,925 A | 1/1997 | Machida et al. | |
| 5,595,063 A | 1/1997 | Trage et al. | |
| 5,616,171 A | 4/1997 | Barris et al. | |
| 5,617,771 A | 4/1997 | Landrum | |
| 5,634,952 A | 6/1997 | Kasai et al. | |
| 5,669,365 A | 9/1997 | Gärtner et al. | |
| 5,718,281 A | 2/1998 | Bartalone et al. | |
| 5,725,621 A | 3/1998 | Pruette et al. | |
| 5,746,807 A | 5/1998 | Thelen et al. | |
| 5,794,453 A | 8/1998 | Barnwell | |
| 5,827,338 A * | 10/1998 | Horvat | 55/285 |
| 5,853,577 A | 12/1998 | Gizowski et al. | |
| 5,860,187 A | 1/1999 | Flaszynski et al. | |
| 5,900,043 A | 5/1999 | Grandjean et al. | |
| 5,930,994 A | 8/1999 | Shimato et al. | |
| 5,961,678 A | 10/1999 | Pruette et al. | |
| 5,988,989 A | 11/1999 | Hobson | |
| 6,010,547 A | 1/2000 | Jeong et al. | |
| 6,029,448 A | 2/2000 | Hobson | |
| 6,109,040 A | 8/2000 | Ellison, Jr. et al. | |
| 6,241,878 B1 | 6/2001 | Snaper | |
| 6,251,294 B1 | 6/2001 | Davis et al. | |
| 6,334,881 B1 * | 1/2002 | Giannetta et al. | 55/486 |
| 6,447,583 B1 | 9/2002 | Thelen et al. | |
| 6,526,753 B1 | 3/2003 | Bailey | |
| 6,620,217 B2 | 9/2003 | Bruckmann et al. | |
| 6,641,646 B2 * | 11/2003 | Rosenberg | 95/280 |
| 6,644,023 B2 | 11/2003 | Hirota et al. | |
| 6,663,694 B2 | 12/2003 | Hubbard et al. | |
| 6,755,016 B2 | 6/2004 | Dittler et al. | |
| 6,793,716 B2 | 9/2004 | Rigaudeau et al. | |
| 6,797,037 B2 | 9/2004 | Golner et al. | |
| 6,827,763 B2 | 12/2004 | McGee et al. | |
| 6,833,017 B2 | 12/2004 | Quigley | |
| 6,835,224 B2 | 12/2004 | Cheng | |
| 6,840,387 B2 | 1/2005 | Beer et al. | |
| 6,857,262 B2 | 2/2005 | Rendahl et al. | |
| 6,893,487 B2 | 5/2005 | Alger et al. | |
| 7,002,029 B2 * | 2/2006 | Davis | 554/16 |
| 7,025,811 B2 * | 4/2006 | Streichsbier et al. | 95/279 |
| 7,047,731 B2 * | 5/2006 | Foster et al. | 60/297 |
| 7,138,057 B2 * | 11/2006 | Debes et al. | 210/500.36 |
| 2004/0016699 A1 | 1/2004 | Bayevsky | |
| 2004/0103788 A1 | 6/2004 | Streichsbier et al. | |
| 2004/0112218 A1 | 6/2004 | Steiner | |
| 2004/0120836 A1 * | 6/2004 | Dai et al. | 417/413.2 |
| 2004/0226290 A1 | 11/2004 | Bailey | |
| 2005/0011357 A1 | 1/2005 | Crawley | |
| 2005/0139705 A1 | 6/2005 | McGovern et al. | |
| 2005/0178111 A1 | 8/2005 | Kammel | |
| 2005/0191218 A1 | 9/2005 | Alward et al. | |
| 2005/0252375 A1 * | 11/2005 | Iles et al. | 95/148 |
| 2006/0201326 A1 * | 9/2006 | Wagner et al. | 95/280 |
| 2006/0201327 A1 * | 9/2006 | Janse Van Rensburg et al. | 96/4 |

FOREIGN PATENT DOCUMENTS

| | | |
|---|---|---|
| EP | 0 930 422 A1 | 7/1999 |
| EP | 1336729 | 8/2003 |
| GB | 2371246 A | 7/2002 |
| JP | 4-31613 | 2/1992 |
| JP | 07 47214 A | 2/1995 |
| JP | 7-54632 | 2/1995 |
| JP | 7-63038 | 3/1995 |
| JP | 07 289835 A | 11/1995 |
| JP | 0814026 A | 1/1996 |
| JP | 177462 A | 7/1996 |
| WO | WO 01/65080 A1 | 9/2001 |

OTHER PUBLICATIONS

CleanAir Systems, AeroCLEAN Permit Filter Cleaning System (Operations Manual), 2003 (11 pages).
Lubrizol, CombiClean Diesel Particulate Filter Cleaning Station, Mar. 2003 (2 pages).
CombiClean™ Environmentally-friendly filter cleaning (2 pages) (www.lubrizol.com/enginecontrol) Visited Jul. 13, 2004.
CombiClean™ Diesel Particulate Filter Cleaning Station (2 pages) (www.lubrizol.com/enginecontrol) Visited Jul. 13, 2004.
CombiClean™ Diesel Particulate Filter Cleaning System—Operating Instructions (1 page) (www.lubrizol.com/enginecontrol) Visited Jul. 13, 2004.
"Vacuum Tanks & Pumps" Domestic Corporation Marine Systems (3 pages).
"Vacuum Tank Parts List & Diagram" Domestic Corporation Marine Systems (1 page).
"Piezo Technology" Piezolith 3000 document (2 pages).

* cited by examiner

FILTER SERVICE SYSTEM

GOVERNMENT RIGHTS

This invention was made with Government support under the terms of Contract No. DE-FC05-97OR22605 awarded by the Department of Energy. The Government may have certain rights in this invention.

TECHNICAL FIELD

The present disclosure relates generally to a filter service system, and more particularly to a system for removing matter from a filter.

BACKGROUND

Engines, including diesel engines, gasoline engines, natural gas engines, and other engines known in the art, may exhaust a complex mixture of pollutants. The pollutants may be composed of gaseous and solid material, including particulate matter, nitrogen oxides ("NOx"), and sulfur compounds.

Due to heightened environmental concerns, engine exhaust emission standards have become increasingly stringent over the years. The amount of pollutants emitted from an engine may be regulated depending on the type, size, and/or class of engine. One method that has been implemented by engine manufacturers to comply with the regulation of particulate matter, NOx, and sulfur compounds exhausted to the environment has been to remove these pollutants from the exhaust flow of an engine with filters. However, extended use and repeated regeneration of such filters may cause the pollutants to build up in the components of the filters, thereby causing filter functionality and engine performance to decrease.

One method of removing built-up pollutants from a filter may be to remove the clogged filter from the work machine to which it is connected and direct a flow of gas through the filter in a direction that is opposite the direction of normal flow. The filter may be large, heavy, and difficult to disconnect, however, making it cumbersome, time consuming, and dangerous to remove the filter from the engine of the work machine for servicing.

Another method of removing matter from a filter may be to divert an exhaust flow from the clogged filter to a separate filter, without disconnecting either filter from the engine. While the exhaust flow is diverted, air may be directed through the clogged filter in a direction opposite the normal flow. Since such matter removal systems include a second filter, however, they may be larger and more costly than single filter systems. In addition, since these systems are not disconnected or removed from the engine during cleaning, the user may not be able to manipulate the reverse flow of air within the housing of the clogged filter. Thus, matter that is located out of the direct path of the reverse flow may be difficult to remove from such systems. Furthermore, such systems may not be capable of applying a negative pressure to the clogged filter to assist in removing the matter.

U.S. Pat. No. 5,566,545 (the '545 patent) teaches a system for removing particulate matter from an engine filter. In particular, the '545 patent discloses a filter connected to an engine exhaust line, a valve structure within the exhaust line, and an air feeder. When air is supplied to the filter in a reverse flow direction, the air may remove captured particulates from the filter.

Although the '545 patent may teach the removal of matter from a filter using a reversed flow, the system described therein requires the use of a second filter during the reverse flow condition, thereby increasing the overall cost and size of the system. In addition, the system does not allow for the manipulation of the reverse flow of air within the filter during matter removal. Moreover, the system is not capable of supplying a negative pressure to the filter to assist in the filter cleaning process.

The present disclosure is directed to overcoming one or more of the problems set forth above.

SUMMARY OF THE INVENTION

In one embodiment of the present disclosure, a system for removing matter from a filtering device includes a gas pressurization assembly. An element of the assembly is removably attachable to a first orifice of the filtering device. The system also includes a vacuum source fluidly connected to a second orifice of the filtering device.

In another embodiment of the present disclosure, a method of removing matter from a filtering device includes connecting a gas pressurization assembly to a first orifice of the filtering device and connecting a vacuum source to a second orifice of the filtering device. The method also includes supplying a flow of compressed gas to at least a portion of the filtering device with the gas pressurization assembly.

In yet another embodiment of the present disclosure, a system for removing matter from a filtering device includes a membrane connected to a housing of the filtering device and configured to direct a pulse of gas in a direction substantially parallel to an axis of normal flow through the filtering device. The system also includes an actuator connected to the membrane and configured to assist in directing the pulse of gas.

BRIEF DESCRIPTION OF THE DRAWINGS

FIG. 4b is a side view of the flow distribution device of FIG. 4a.

FIG. 4c is another side view of the flow distribution device of FIG. 4a.

DETAILED DESCRIPTION

Exemplary embodiments of the present disclosure are illustrated in the accompanying drawings. Wherever possible the same reference numbers will be used throughout the drawings to refer to the same or like parts.

Figure 1:
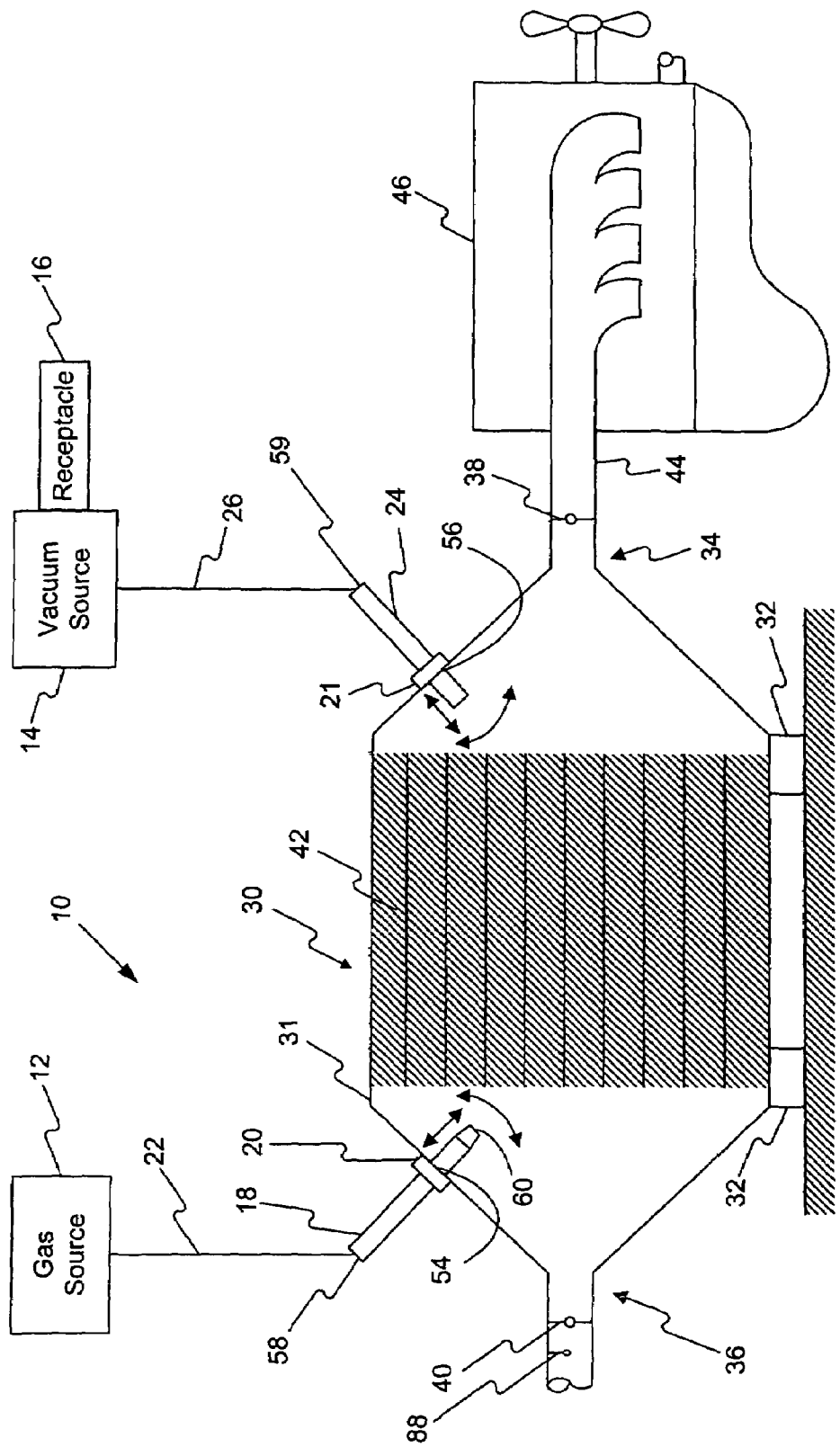
FIG. 1 is a diagrammatic illustration of a service system connected to a filter according to an exemplary embodiment of the present disclosure.

FIG. 1 illustrates an exemplary embodiment of a service system 10 attached to a filter 30. The service system 10 may include a gas source 12, a gas line 22, and a flow distribution device 18. The service system 10 may further include a vacuum source 14, a vacuum line 26, a flow receiving device 24, and a receptacle 16. The service system 10 may be operatively attached to the filter 30 for service and may be removed from the filter 30 when service is complete. As such, a user may operatively attach and remove the service system 10 without removing the filter 30 from the work machine, vehicle, or other device to which the filter 30 is attached. As used herein, the term "work machine" may include on-road vehicles, off-road vehicles, and stationary machines such as, for example, generators and/or other exhaust producing devices.

In some embodiments of the present disclosure, the filter 30 may be connected to an internal combustion engine 46 such as, for example, a diesel engine. The engine 46 may include an exhaust line 44 connecting an exhaust flow of the engine 46 with an inlet 34 of the filter 30. The engine 46 may also include a turbo (not shown) connected to the exhaust line 44. In such an embodiment, the inlet 34 of the filter 30 may be connected to an outlet of the turbo.

An inlet valve 38 may be disposed between the exhaust line 44 of the engine 46 and the inlet 34 of the filter 30. The inlet valve 38 may be configured to allow an exhaust flow of the engine 46 to pass into the filter 30. Alternatively, in some situations the inlet valve 38 may block communication between the engine 46 and the filter 30. Such a configuration may be advantageous during, for example, servicing of the filter 30. In one embodiment of the present disclosure, while the filter 30 is being serviced the inlet valve 38 may be closed to prohibit captured material from flowing back to the engine 46. In such an embodiment, the engine 46 may be turned off during the servicing and thus may not produce an exhaust flow. The inlet valve 38 may be controlled and/or actuated by any means known in the art such as, for example, a solenoid or pneumatics. Alternatively, the inlet valve 38 may be manually controlled.

In some embodiments, one or more work machine diagnostic devices 88 may be disposed proximate an outlet 36 of the filter 30. The work machine diagnostic devices 88 may be, for example, part of the work machine or other device to which the filter 30 is connected and may be external to the filter 30. Alternatively, the work machine diagnostic devices 88 may be internal to the filter 30. Work machine diagnostic devices 88 may be any sensing devices known in the art such as, for example, flow meters, emission meters, pressure transducers, radio devices, or other sensors. Such work machine diagnostic devices 88 may sense, for example, an increase in the levels of soot, NOx, or other pollutants leaving the filter 30. The diagnostic devices 88 may send pollutant level information to a controller or other device (not shown) and may assist in, for example, triggering filter regeneration and/or filter servicing.

Filter 30 may further include an outlet valve 40 disposed proximate an outlet 36 of the filter 30. Outlet valve 40 and inlet valve 38 may be the same type of valve or may be different types of valves depending on the requirements of the application. The valves 38, 40 may be, for example, poppet valves, butterfly valves, or any other type of controllable flow valves known in the art. For example, the valves 38, 40 may be controlled to allow any range of exhaust flow to pass from the engine 46 to the filter 30 and out of the filter 30. The valves 38, 40 may be positioned to completely restrict an exhaust flow of the engine 46 or may allow the flow to pass unrestricted. The valves 38, 40 may be connected to the filter 30 by any conventional means known in the art.

The filter 30 may be any type of filter known in the art such as, for example, a foam cordierite, sintered metal, or silicon carbide type filter. As illustrated in FIG. 1, the filter 30 may include filter media 42. The filter media 42 may include any material useful in removing pollutants from an exhaust flow. In some embodiments of the present disclosure, the filter media 42 may contain catalyst materials capable of collecting, for example, soot, NOx, sulfur compounds, particulate matter, and/or other pollutants known in the art. Such catalyst materials may include, for example, alumina, platinum, rhodium, barium, cerium, and/or alkali metals, alkaline-earth metals, rare-earth metals, or combinations thereof. The filter media 42 may be situated horizontally (as shown in FIG. 1), vertically, radially, or helically. The filter media 42 may also be situated in a honeycomb, mesh, or any other configuration so as to maximize the surface area available for the filtering of pollutants.

The filter 30 includes a filter housing 31 and may be secured by any means known in the art. The filter 30 may include, for example, filter brackets 32 connected to the filter housing 31. Filter brackets 32 may be made of metal, plastic, rubber, or any other material known in the art to facilitate connecting a filter to a structure associated with the engine 46. For example, filter brackets 32 may secure the filter 30 to a work machine and may dampen the filter 30 from vibration, jarring, or sudden movements of the work machine to which the filter 30 is attached.

As shown in FIG. 1, the gas source 12 of the service system 10 may be connected to the flow distribution device 18 by gas line 22. The gas line 22 may be any type of tubing, piping, or hose known in the art. The gas line 22 may be, for example, plastic, rubber, aluminum, copper, steel, or any other material capable of delivering a compressed gas in a controlled manner, and may be flexible or rigid. The length of the gas line 22 may be minimized to facilitate operation of the service system 10, while reducing the pressure drop between the gas source 12 and the filter 30. The gas line 22 may connect to a flow distribution device inlet 58. This connection may allow a gas to pass from the gas source 12 to the flow distribution device 18 and into the filter 30.

The gas source 12 may include, for example, an air compressor or any other device capable of compressing a gas and delivering the compressed gas through the gas line 22. For example, in one embodiment of the present disclosure the gas source 12 may be a shop air compressor of a type known in the art and may supply compressed air at approximately 70 to 110 psi. This range may be increased or decreased depending on the size of the gas source 12 used. The gas source 12 may deliver a gas in either a pulsed flow, a uniform flow, or some combination thereof. The gas may be any gas known in the art useful in removing ash or other matter from a filter such as, for example, air, oxygen, hydrogen, nitrogen, or helium. It is understood that the gas may be capable of being compressed and delivered through the gas line 22.

The flow distribution device 18 may be rigidly connected to a first orifice 54 formed in filter housing 31. Alternatively, the flow distribution device 18 may be removably attached to the filter housing 31. This connection may be facilitated by a boss 20. In some embodiments, at least a portion of the flow distribution device 18 may be internal to the filter housing 31. In such an embodiment, the flow distribution device 18 may have unobstructed access to substantially all of the filter media 42 within the filter 30.

The flow distribution device 18 may be any device capable of distributing a compressed gas in a controlled manner. The flow distribution device 18 may be, for example, a nozzle, a diffuser, or any other like device known in the art. The flow distribution device 18 may be a one-piece device, or may be made of two or more pieces or parts operatively connected to one another. The flow distribution device 18 may be made of, for example, plastic, polyvinyl, steel, copper, aluminum, titanium, or any other material known in the art.

The flow distribution device 18 may be, for example, substantially hollow, substantially cylindrical, and/or any other shape useful in controllably distributing a compressed gas. The shape and configuration of the flow distribution device 18 may enable insertion through, manipulation within, and removal from the rigid orifice 54 of the filter housing 31. The flow distribution device 18 may be adjustably movable into and out of the filter 30 and may swivel within the filter 30 such that the user may position the flow distribution device 18 as close to the filter media 42 as is desirable for assisting in matter removal. The adjustability of the flow distribution device 18 is illustrated by the arrows in FIG. 1. Thus, the flow distribution device 18 may be manipulated or otherwise positioned to obtain maximum gas distribution across the filter media 42. The flow distribution device 18 may further include a stop (not shown), which may limit the distance that the flow distribution device 18 may be inserted into the filter 30 and may prevent damage to the filter media 42. In some embodiments of the present disclosure, the stop may be fixedly attached to the flow distribution device 18, while in other embodiments, the stop may be adjustable.

Figure 2:
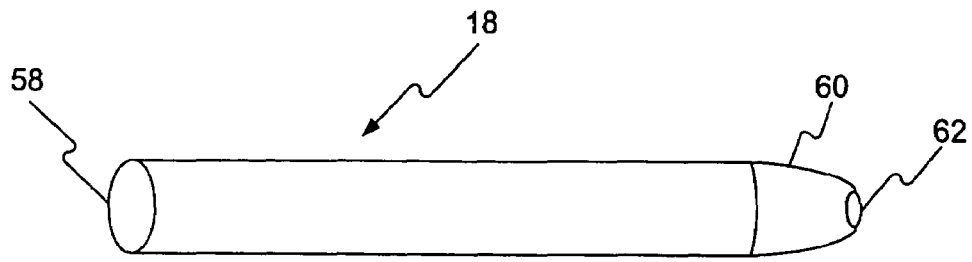
FIG. 2 is a side view of the flow distribution device of FIG. 1 according to an embodiment of the present disclosure.

As illustrated in FIG. 2, the tip 60 of the flow distribution device 18 may include at least one hole 62. The hole 62 may be of any size, shape, and/or angle to facilitate the delivery of a compressed gas. The flow distribution device 18 may deliver a compressed gas across at least a portion of filter media 42. It is understood that in some embodiments of the present disclosure, the flow distribution device 18 may be capable of delivering a compressed gas across substantially an entire cross-section of the filter media 42. The size, location, and angle of hole 62 may be selectively determined based on the desired distribution and pressure of the gas delivered by the flow distribution device 18.

Figure 3:
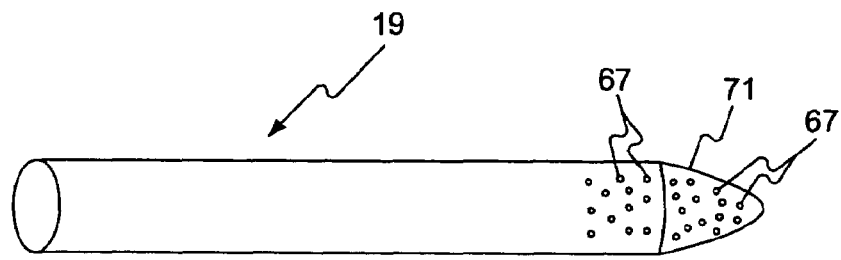
FIG. 3 is a side view of a flow distribution device according to another embodiment of the present disclosure.

As illustrated in FIG. 3, an alternative flow distribution device 19 may include a number of holes 67. The holes 67 may be evenly spaced or unevenly spaced and may be at any angle to facilitate the desired distribution of compressed gas across at least a portion of the filter media 42. The holes 67 may be positioned at the tip 71 of the flow distribution device 19 and may also be positioned along at least a portion of the length of flow distribution device 19. The holes 67 may be of the same or different sizes.

Figure 4:
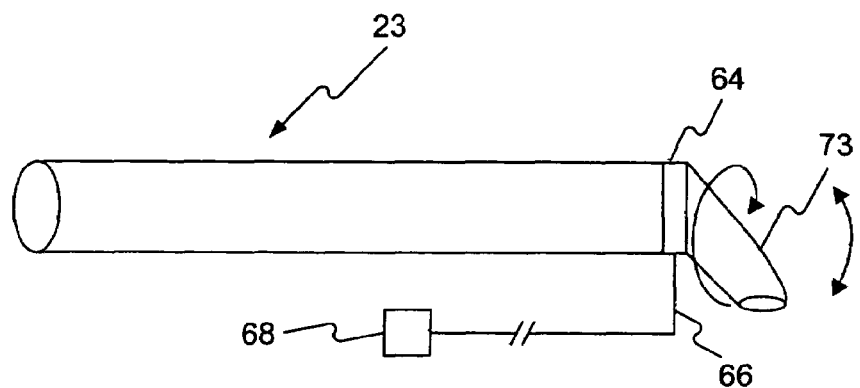
FIG. 4 is a side view of a flow distribution device according to yet another embodiment of the present disclosure.

As shown in FIG. 4, another alternative flow distribution device 23 may include an angled tip 73. The angle of tip 73 may be selected so as to produce a desired distribution of compressed gas across at least a portion of filter media 42. The flow distribution device 23 may further include an actuation device 64. The tip 73 may be movable in the X, Y, and/or Z direction when the actuation device 64 is utilized. For example, the actuation device 64 may enable the user to rotate the tip 73 of the flow distribution device 23 a full 360 degrees. The actuation device 64 may also enable the user to tilt the tip 73 at any angle useful in disbursing a compressed gas across at least a portion of filter media 42. It is understood that the actuation device 64 may be used in conjunction with any embodiment of the tip 60, 71, 73 to facilitate the tip's motion.

The actuation device 64 may be connected to a controller 68 by an actuation device line 66. The controller 68 may be, for example, a central processing unit, an electronic control module, a computer, a radio transmitter, or any other type of controller known in the art. The controller 68 may be connected to an operator interface (not shown) such as, for example, a switch, rod, lever, joy stick, or any other device enabling a user to manipulate a mechanical component remotely. The connection made between the actuation device 64 and the controller 68 via actuation device line 66 may be an electric or fluid connection. Although shown in FIG. 4 as being outside of the flow distribution device 23, it is understood that the actuation device line 66 may connect to the actuation device 64 and may travel within a hollow passage of the flow distribution device 23 until exiting the flow distribution device 23 outside of the filter 30. This path of travel may assist in forming a substantially air tight seal between the flow distribution device 23 and the filter housing 31. It is understood that in embodiments where the actuation device 64 is radio controlled, the device line 66 may be omitted.

Figure 4A:
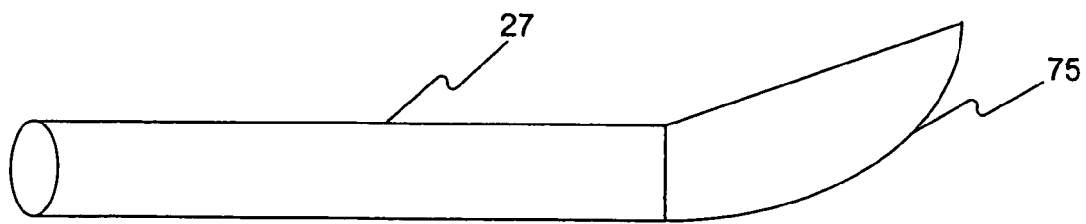
FIG. 4a is a side view of a flow distribution device according to another embodiment of the present disclosure.
Figure 4B:
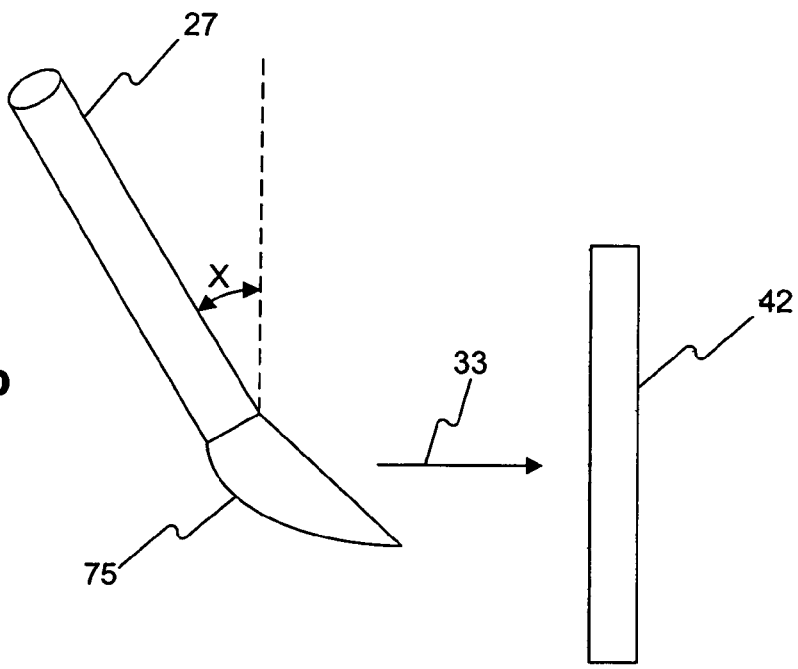

As shown in FIG. 4a, yet another alternative flow distribution device 27 may include an angled tip 75 having a shovel-like or scoop-like configuration. The angle of tip 75 may be selected so as to produce a desired distribution of compressed gas across at least a portion of filter media 42 and may direct compressed gas in a direction substantially parallel to the normal flow of exhaust gas through the filter 30 (discussed in greater detail below). Accordingly, the angle of tip 75 may be chosen depending on the angle at which the flow distribution device 27 is disposed relative to the filter media 42. For example, in some embodiments the flow distribution device 27 may be positioned at an angle X relative to the filter media 42. As shown in FIG. 4b, in such an embodiment, the tip 75 may be angled to direct a flow of gas substantially perpendicular to filter media 42 as illustrated by arrow 33.

Figure 4C:
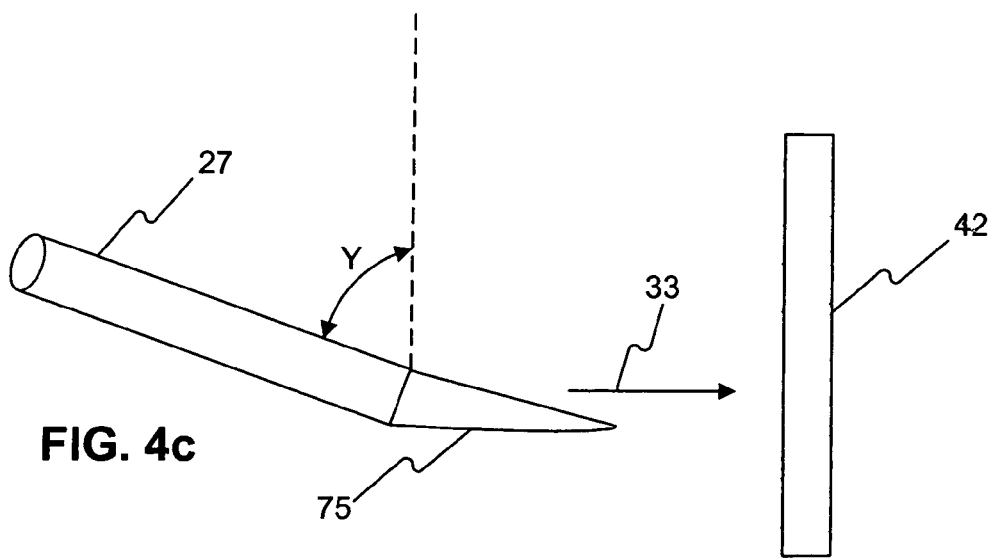

In other embodiments, the flow distribution device 27 may be positioned, for example, at a larger angle Y angle relative to the filter media 42. As shown in FIG. 4c, in such embodiments, the tip 75 may have a complimentary angle and may be configured to direct a flow of gas substantially perpendicular to filter media 42 as illustrated by arrow 35. It is understood that in embodiments where the flow distribution device 27 is positioned, for example, at a 90 degree angle relative to the filter media 42, the tip 75 may be omitted. In some embodiments, the tip 75 may be retractable within the flow distribution device 27 such that the tip 75 may be disposed within the flow distribution device 27 when the flow distribution device 27 is being inserted into and removed from the filter 30.

Figure 5:
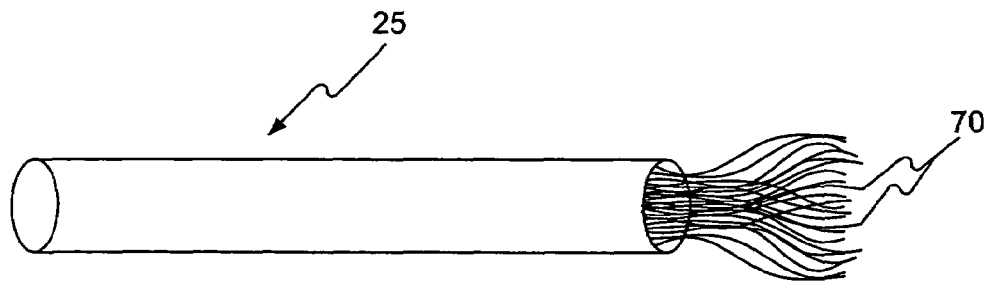
FIG. 5 is a side view of a flow distribution device according to a further embodiment of the present disclosure.

FIG. 5 illustrates a further embodiment of a flow distribution device 25. In this embodiment, the flow distribution device 25 may include a plurality of hollow legs 70. The legs 70 may be configured to deliver a compressed gas across at least a portion of filter 30. The legs 70 may be flexible so as to be movable independent of the flow distribution device 25 when a compressed gas is supplied thereto. The legs 70 may be, for example, flexible air flow fibers of a type known in the art. In this embodiment, the tip may be omitted, and the legs 70 may be fluidly connected directly to the flow distribution device 25 such that substantially all of the gas supplied by the flow distribution device 25 passes through the legs 70.

The rigid or removably attachable connection between the flow distribution device 18 and the filter housing 31 may be facilitated by the boss 20. The boss 20 may be any type of boss known in the art and may be made of any material known in the art to be useful in rigidly or otherwise operatively connecting a device such as a flow distribution device 18 to another device such as a filter 30. Such materials may include, for example, steel, aluminum, copper, tin, plastic, vinyl, and/or rubber. The inside diameter of the boss 20, and thus the size and/or type of the boss 20, may be determined by the size and/or type of the flow distribution device 18 to be used.

The boss 20 may enable a user to manually manipulate an end of the flow distribution device 18 that is outside of the filter 30 so as to desirably distribute compressed gas across at least a portion of the filter media 42. In such an embodiment, the connection may be substantially airtight. A sheath, wrap, or other flexible connection mechanism (not shown) may facilitate the substantially airtight connection between the flow distribution device 18 and the boss 20, while still enabling the user to operatively manipulate an end of the flow distribution device 18. It is understood that in embodiments where the flow distribution device 18 is removably attached to the filter housing 31 or is otherwise relatively movable with respect to the filter media 42 while connected thereto, the gas line 22 may be flexible so as to facilitate the flow distribution device's installation, movement, and removal. Alternatively, the flow distribution device 18 may be fixedly attached to the filter housing 31 such that the flow distribution device 18 may not be movable with respect to filter media 42 once connected to the boss 20. The boss 20 may be fixedly mounted to an outer surface of filter housing 31 by any connection means known in the art such as, for example, weldments, adhesives, screws, and/or brackets.

In an embodiment where the flow distribution device 18 is removably attached to the filter 30 through the boss 20, the inside diameter of the boss 20 may be smooth in order to facilitate relative movement therebetween. The inside diameter of the boss 20 may also be slightly larger than the outside diameter of the flow distribution device 18 to facilitate movement while maintaining the proper seal. In other embodiments where the flow distribution device 18 is removably attached to the filter 30, the inside diameter of the boss 20 may be threaded. In such embodiments, the outside diameter of the flow distribution device 18 may include threads corresponding to those located on the inside diameter of the boss 20 so as to facilitate a connection therebetween.

Alternatively, in embodiments where the flow distribution device 18 is fixedly attached to the boss 20 such that there is no relative movement between the flow distribution device 18 and the filter 30, the flow distribution device 18 may be connected to the boss 20 by any connection means known in the art such as, for example, weldments, adhesives, screws, and/or brackets.

As shown in FIG. 1, the vacuum source 14 of the service system 10 may be connected to the flow receiving device 24 by vacuum line 26. The vacuum source 14 may also include a receptacle 16. The flow receiving device 24 may be connected to a second orifice 56 of the filter housing 31. Alternatively, the flow receiving device 24 may be rigidly connected or removably attached to the filter housing 31 via a boss 21. It is understood that the connection between the flow receiving device 24 and the boss 21 may have gaseous and mechanical characteristics similar to the connection between the flow distribution device 18 and the boss 20.

The boss 21 may be any type of boss known in the art, and may have mechanical characteristics similar to those of boss 20. The inside diameter of the boss 21 may be sized to fit the outside diameter of the flow receiving device 24 and, in some embodiments of the present disclosure, boss 21 may be the same as boss 20. Like boss 20, boss 21 may be attached to the filter housing 31 by any conventional means and the location of boss 21 corresponds to the location of the second orifice 56. Boss 21 may facilitate a substantially airtight connection between the filter 30 and the flow receiving device 24. This connection may be rigid, threaded, or may allow for movement of the flow receiving device 24 relative to the filter media 42 depending on the requirements of each application. A sheath, wrap, or other flexible connection mechanism (not shown) may facilitate this substantially airtight connection.

The vacuum source 14 may include, for example, a shop vacuum, a vacuum pump, or any other device capable of creating negative pressure within another device. The vacuum source 14 may be of any power or capacity useful in cleaning the filter 30, and its size may be limited by the size and/or type of filter 30 being cleaned. For example, a filter 30 including cordierite plugs may not be capable of withstanding a negative pressure of greater than approximately 150 psi without sustaining damage to the plugs and/or other filter media 42. Thus, a vacuum source 14 used to clean such a filter 30 may have a maximum capacity that is less than approximately 150 psi. In some embodiments of the present disclosure, the vacuum source 14 may supply a constant vacuum to, and thereby create a constant negative pressure within, the filter 30. Alternatively, the vacuum source 14 may supply a pulsed or varying vacuum to the filter 30. The consistency of the vacuum supplied to the filter 30 may vary with each application, and may depend on the structure, design, type, and/or other characteristics of the filter 30.

As shown in FIG. 1, the vacuum line 26 may connect the vacuum source 14 to the flow receiving device 24. This fluid connection may allow a solid, liquid, or gas to pass from the filter 30 and through the flow receiving device 24. It is understood the fluid connection may permit ash or other matter released from the filter media 42 to pass from the filter 30 to the vacuum source 14 and/or to the receptacle 16. The vacuum line 26 may be any type of vacuum line known in the art, and may have mechanical characteristics similar to those of gas line 22. The vacuum line 26 may be as short as possible to facilitate operation of the service system 10 and to reduce the pressure drop between the vacuum source 14 and the filter 30. The inside diameter of the vacuum line 26 may be sized to fit the outside diameter of the flow receiving device 24 and in some embodiments of the present disclosure, vacuum line 26 may be structurally the same as the gas line 22. The vacuum line 26 may be attached to an outlet 59 of the flow receiving device 24 by any conventional means. For example, the vacuum line 26 may be secured to the flow receiving device 24 by adhesives, glue, a compression collar, a ring, matching sets of threads, quick connects, snap fits, or any other conventional means. It is understood that in an embodiment where threads are used to secure the vacuum line 26 to the flow receiving device 24, the corresponding sets of threads may be located on the inside diameter of the vacuum line 26 and the outside diameter of the flow receiving device 24 or, alternatively, on the outside diameter of the vacuum line 26 and the inside diameter of the flow receiving device 24. The vacuum line 26 may be rigid or flexible, and may facilitate movement of at least a portion of the flow receiving device 24 into and/or within the filter housing 31 of the filter 30.

The flow receiving device 24 may be any device capable of delivering a negative pressure in a controlled manner. The flow receiving device 24 may be, for example, a tube, collector, shaft, sheath, or any other like device known in the art. The flow receiving device 24 may be a one-piece device, or may be made of two or more pieces or parts operatively connected to each other. The flow receiving device 24 may be rigid enough to withstand the negative pressure supplied without being more than nominally deformed. The flow receiving device 24 may be composed of, for example, plastic, polyvinyl, steel, copper, aluminum, titanium, or any other material known in the art. The flow receiving device 24 may be, for example, substantially hollow, substantially cylindrical, and/or any other shape useful in controllably delivering a negative pressure. The shape of the flow receiving device 24 may enable insertion through, manipulation within, and removal from rigid orifice 56 of the filter 30. The flow receiving device 24 may be sized to deliver an amount of negative pressure useful in assisting in the removal of matter from the filter 30 without causing damage to the filter media 42 or other filter components. The flow receiving device 24 may be adjustably movable into and out of the filter housing 31 such that a user may position the flow receiving device 24 as close to the filter media 42 as is desirable for assisting in matter removal. Thus, the flow receiving device 24 may be manipulated or otherwise positioned to maximize the negative pressure delivered across the filter media 42.

Figure 1A:
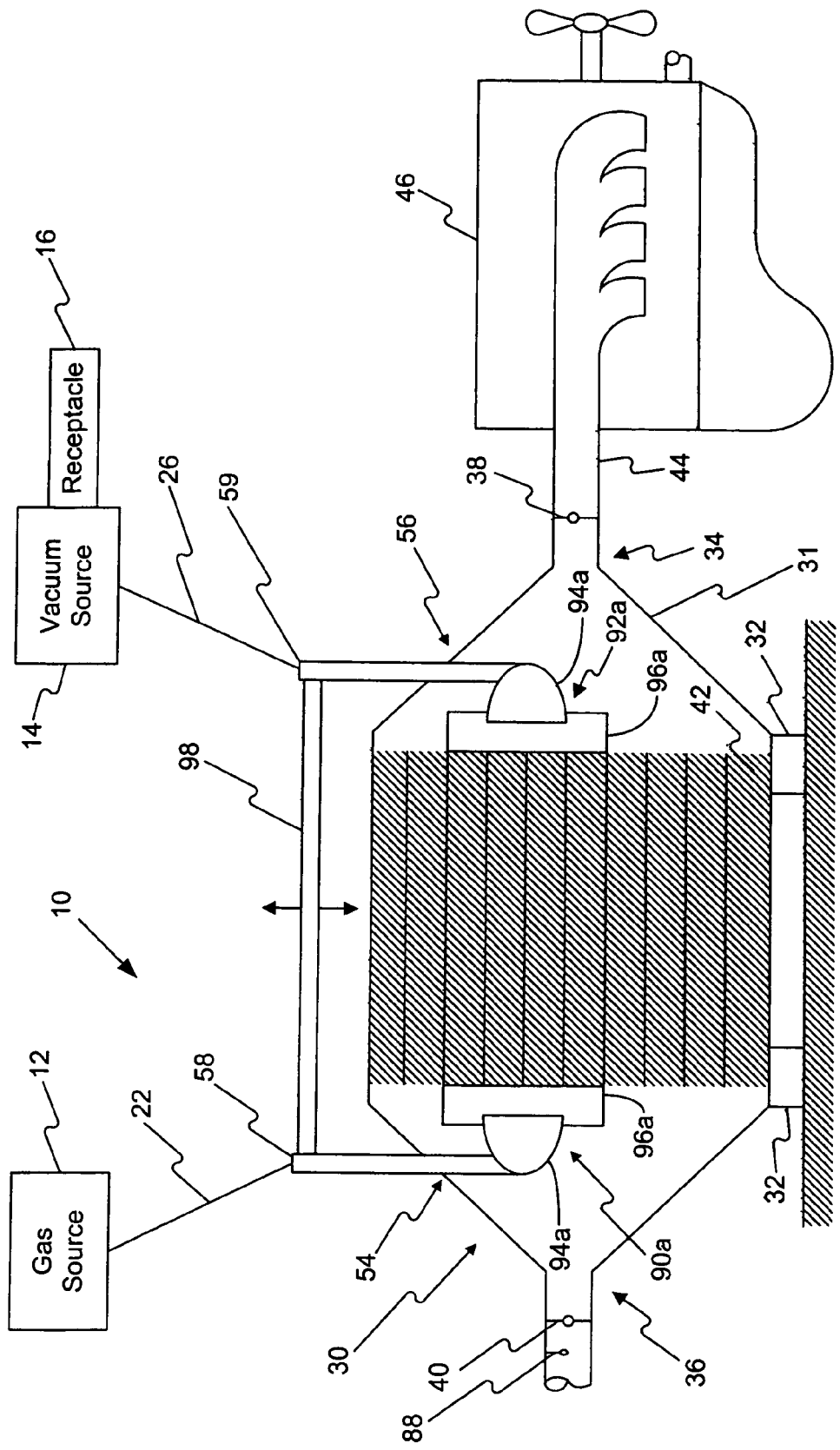
FIG. 1a is a diagrammatic illustration of the service system of FIG. 1 according to another exemplary embodiment of the present disclosure.

As shown in FIG. 1a, the flow distribution device 18 and the flow receiving device 24 of FIG. 1 may take the form of two end effectors 90a, 92a. The end effectors 90a, 92a may be any shape, size, and/or configuration to assist in maximizing the distribution of air across the filter media 42. For example, in some embodiments, each end effector 90a, 92a may be a one-piece device having a hub portion 94a and a media interface portion 96a. In other embodiments, the end effectors 90a, 92a may be made of two or more pieces. The hub portion 94a of the end effectors 90a, 92a may be fluidly connected to the gas source 12 and the vacuum source 14, respectively, to facilitate the flow of air and/or matter removed from the filter media 42. This connection may be rigid or flexible depending on, for example, the configuration of the filter 30. The connection may enable at least a portion of the end effectors 90a, 92a to mate with at least a portion of a surface of the filter media 42.

The media interface portion 96a may be, for example, round, tapered, box-shaped, or any other suitable shape, and may be sized and/or otherwise configured to mate with the filter media 42 without causing damage when a compressed gas or a negative pressure is supplied thereto. The media interface portions 96a may be rigid or malleable, or may include at least a component that is rigid or malleable, to facilitate a desirable contact and/or seal with the filter media 42, and may be made of any suitable material or combination of materials known in the art. At least a portion of the media interface portions 96a may rotate or be otherwise movable relative to the filter media 42 to alter the distribution of flow across the media 42. The movable portions may be actuated by, for example, a solenoid, an electric motor, or other means (not shown) known in the art.

As shown in FIG. 1a, the end effectors 90a, 92a may be directly aligned with each other on opposite sides of the filter media 42. To facilitate the direct alignment and/or coordinated movement of the end effectors 90a, 92a, the flow distribution device 18 and the flow receiving device 24 may be connected by, for example, a connector 98. The connector 98 may be, for example, a rod, a bar, a handle, a beam, or other suitable connecting means and may be made from any suitable material known in the art. The end effectors 90a, 92a may be rigidly mounted to the connector 98 such that each may be manipulated in unison by manipulating the connector 98. Exemplary movement of the connector 98 is illustrated by the arrows in FIG. 1a. Manipulating the connector 98 may, thus, cause corresponding movement of the end effectors 90a, 92a. In some embodiments, the connector 98 may be manipulated manually while in other embodiments, the connector 98 may be actuated using any conventional actuation means. Such actuation means may include, for example, electric, hydraulic, pneumatic, and/or other controls known in the art.

The filter housing 31 may define suitable orifices 54, 56 to accept the flow distribution device 18 and the flow receiving device 24 respectively. The orifices 54, 56 may be sized and/or shaped to allow for this movement, and a flexible hood (not shown) or other like structure may be used to form a seal between the end effectors 90a, 92a and the filter housing 31 during operation. The flexible hood may be sealed to the devices 18, 24 and to the filter housing 31 of the filter 30 with adhesives, or by any other suitable means. The flexible hood may be of a type known in the art and may be made of, for example, plastic, rubber, or other suitable materials known in the art. In such an embodiment, at least one of the bosses 20, 21 and/or at least one of the valves 38, 40 may be omitted. It is understood that in some embodiments where end effectors 90a, 92a are used, the orifices 54, 56 may be relatively large to enable insertion, manipulation, and removal of the end effectors 90a, 92a. Such large orifices 54, 56 could reduce the efficiency of the system 10 if a proper seal (as explained above) is not formed.

Figure 1B:
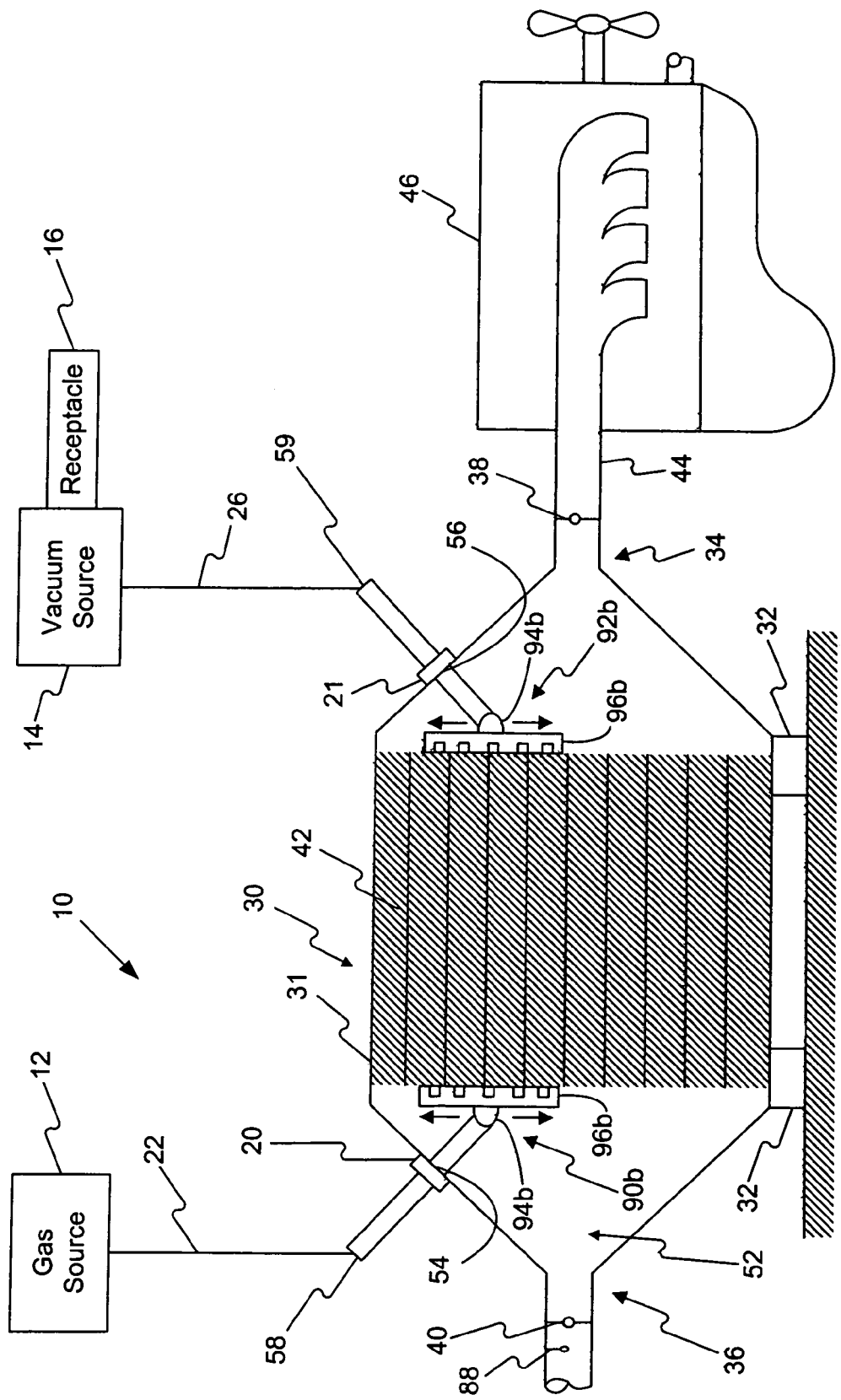
FIG. 1b is a diagrammatic illustration of the service system of FIG. 1 according to yet another exemplary embodiment of the present disclosure.

In other embodiments, at least a portion of the end effectors may be, for example, relatively narrow and/or substantially rectangular. For example, as FIG. 1b illustrates, each of the end effectors 90b, 92b may include a hub portion 94b and a media interface portion 96b that is substantially narrow and/or substantially rectangular. The end effectors 90b, 92b may be made of the same or like materials, and may have the same or like mechanical characteristics, as the end effectors 90a, 92a described above with respect to FIG. 1a. The media interface portions 96b, however, may be narrower and/or have a smaller surface area than the portions 96a shown in FIG. 1a. As a result, the orifices 54, 56 defined by the filter housing 31 in such embodiments may be smaller than those discussed above with respect to end effectors 90a, 92a. Such orifices 54, 56 may be sized and shaped to accept the end effectors 90b, 92b, and may allow the media interface portions 96b to access substantially an entire face of the filter media 42. Such orifices 54, 56 may require smaller flexible hoods (not shown) or other like structures to form a seal between the end effectors 90b, 92b and the filter housing 31 during operation. Alternatively, the flexible hoods may form a seal between the end effectors 90b, 92b and the bosses 20, 21. The bosses 20, 21 may be sized corresponding to the orifices 54, 56 to allow for relative movement between the end effectors 90b, 92b and the filter housing 31.

The media interface portions 96b may be rotatably connected about the end effectors 90b, 92b by the hub portions 94b. This rotatable connection may enable the end effectors 90b, 92b to, for example, align for insertion into the filter 30. This connection may be facilitated by any suitable rotatable connecting means known in the art. It is understood that the connection may be a fluid connection as described above. In such embodiments, the end effector 90b and/or the end effector 92b may further include an adjustable stop (not shown) to prevent insertion into the filter 30 beyond a pre-determined safe distance. This safe distance may prevent damage to, for example, the filter media 42. In some embodiments, the end effector 92b may be omitted and replaced with the flow receiving device 24 of FIG. 1.

Referring again to FIG. 1, the receptacle 16 may be fluidly connected to the vacuum source 14. The receptacle 16 may be configured to collect matter removed from the filter 30, and may be removably attached to the vacuum source 14. For example, in some embodiments, as the vacuum source 14 draws matter from the filter 30, the removed matter may pass through a vacuum filter internal to the vacuum source (not shown). In such embodiments, the receptacle 16 may collect and store the matter collected by the vacuum filter. The receptacle 16 may be any size useful in collecting the matter removed from the filter 30, and may have any useful capacity and shape. For example, the receptacle 16 may be cylindrical or box shaped, and may be a rigid container or a flexible bag. The receptacle 16 may be designed to collect and store matter of any type or composition. In one embodiment of the present disclosure, the receptacle 16 may be designed to store harmful pollutants such as, for example, ash, and may be made of, for example, steel, tin, reinforced cloth, aluminum, composites, ceramics, or any other material known in the art. The receptacle 16 may be rapidly disconnected and reconnected to the vacuum source 14 to facilitate disposal of the matter collected therein.

Figure 6:
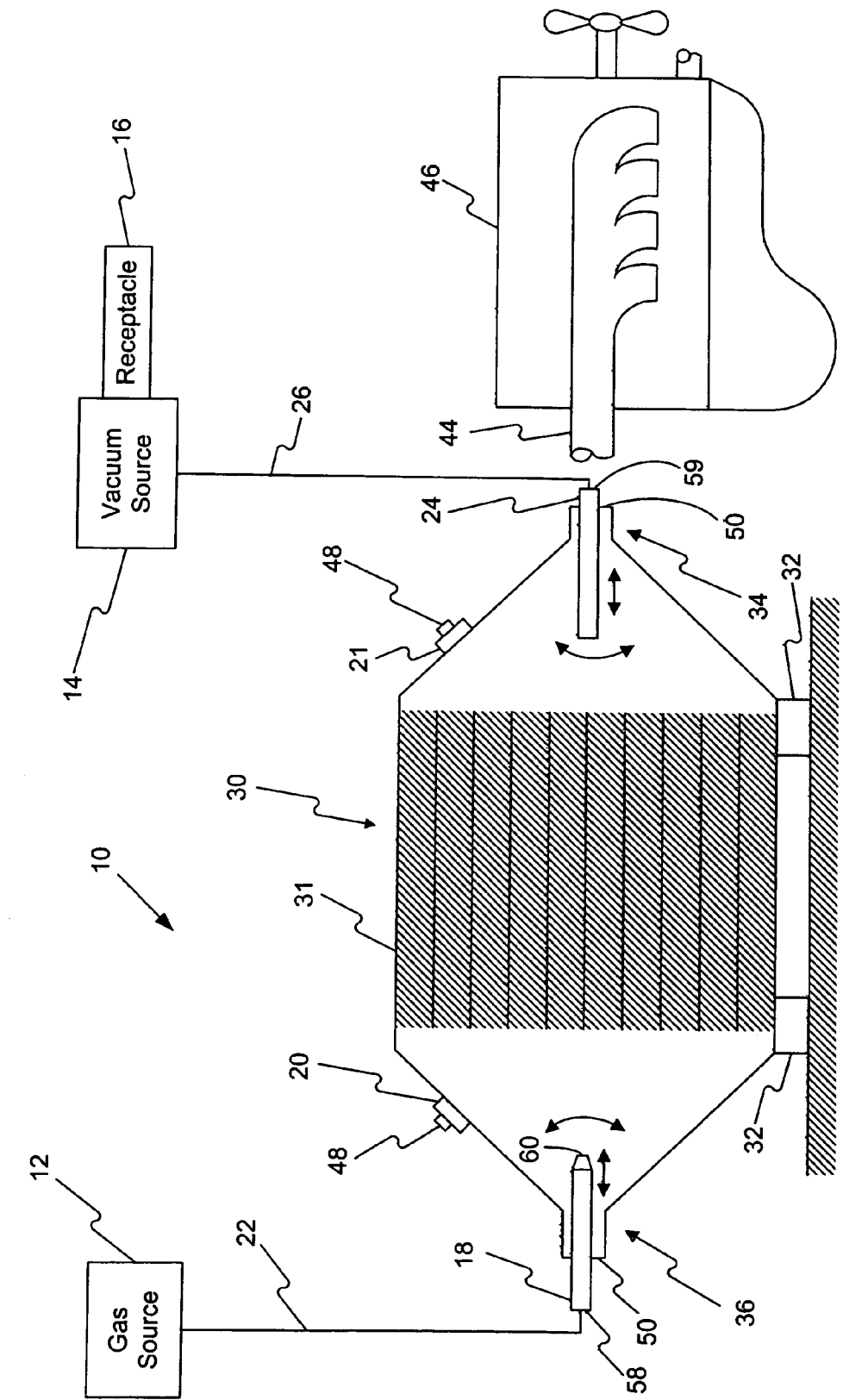
FIG. 6 is a diagrammatic illustration of the service system of FIG. 1 connected to a filter according to another exemplary embodiment of the present disclosure.

FIG. 6 illustrates an embodiment of the present disclosure in which the flow receiving device 24 and the flow distribution device 18 may be connected in-line with the filter 30. In this embodiment, the inlet 34 of the filter 30 may be disconnected from the exhaust line 44 of the engine 46. The outlet 36 of the filter 30 may also be disconnected from any work machine component to which the outlet 36 may have been attached. The flow receiving device 24 and flow distribution device 18 may then be connected to the inlet 34 and outlet 36 respectively. When so connected, at least a portion of the devices 24, 18 may be within the filter housing 31. Each of the devices 24, 18 may be sealidly connected to the filter 30, and the connection may be substantially air tight. As shown in FIG. 6, fittings 50 may be used to facilitate this connection. The fittings 50 may be any type of fittings known in the art, and may provide for a rigid connection between the devices 24, 18 and the filter 30. Alternatively, the fittings 50 may provide for a removably attachable connection in which the devices 24, 18 are movable with respect to the filter media 42 to improve the removal capabilities of the service system 10. The fittings 50 may be made of, for example, a heat shrink material, plastic, rubber, steel, tin, copper, aluminum and/or any other material known in the art. In this embodiment, the inlet and outlet valves 38, 40 (not shown) may be omitted.

It is understood that although the filter 30 may be disconnected from the engine 46 and other components of the work machine, the filter 30 is still connected to the work machine by filter brackets 32 or other connection means. Thus, the filter 30 may be serviced without being removed from the work machine. To enable rapid disconnection from the engine 46 and other components of the work machine, the fittings 50 of FIG. 6 may be, for example, flexible couplings, oversized sleeve couplings, or any other conventional couplings capable of facilitating a rapidly detachable connection between two stationary work machine components.

In the embodiment shown in FIG. 6, the bosses 20, 21 described above with respect to any of FIGS. 1, 1a, or 1b may be sealed with the use of boss caps 48 of a type known in the art. The boss caps 48 may be, for example, threaded or non-threaded plugs, bolts, or rubber stoppers, and may seal the bosses 20, 21 when the flow distribution device 18 and the flow receiving device 24 respectively are not connected to the filter housing 31 in the manner illustrated in FIGS. 1, 1a, and 1b. By sealing the bosses 20, 21, the boss caps 48 may substantially prohibit a gas or matter from entering or exiting the filter 30 while the filter is being serviced. The boss caps 48 may be sized to sealingly fit the inside diameter of the bosses 20, 21, or may be sized to sealingly fit over the outside of the bosses 20, 21. Alternatively, in embodiments such as the embodiment illustrated in FIG. 6, the bosses 20, 21 may be omitted.

Figure 7:
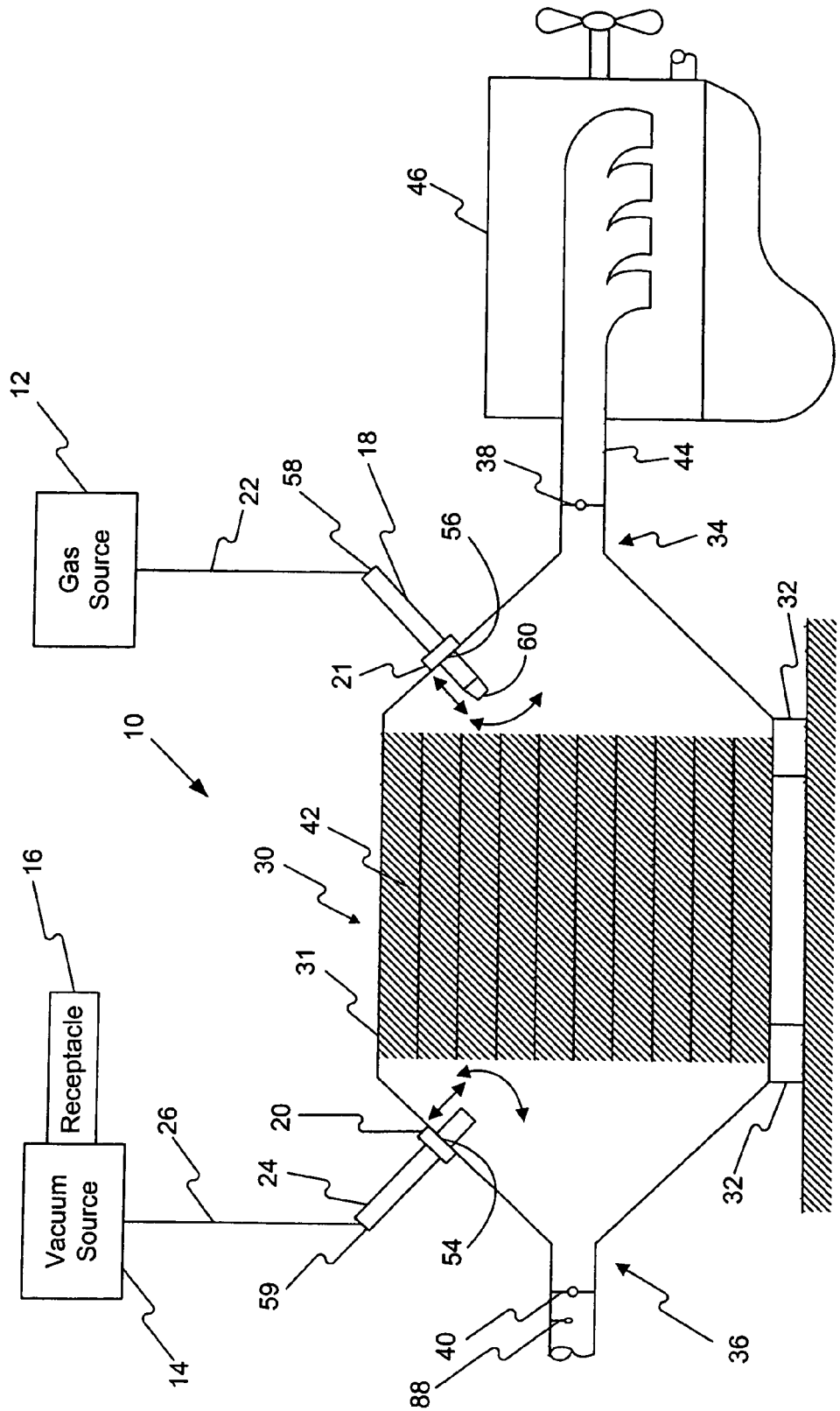
FIG. 7 is a diagrammatic illustration of the service system of FIG. 1 connected to a filter according to yet another exemplary embodiment of the present disclosure.

As shown in FIG. 7, in another embodiment of the present disclosure, the flow distribution device 18, and thus, the gas source 12, may be connected to boss 21 and positioned within the filter housing 31 through the second orifice 56. In this embodiment, the flow receiving device 24 may be connected to boss 20 and may be positioned within the filter housing 31 through the first orifice 54. Each of these connections may be useful in removing matter from the filter 30.

Figure 8:
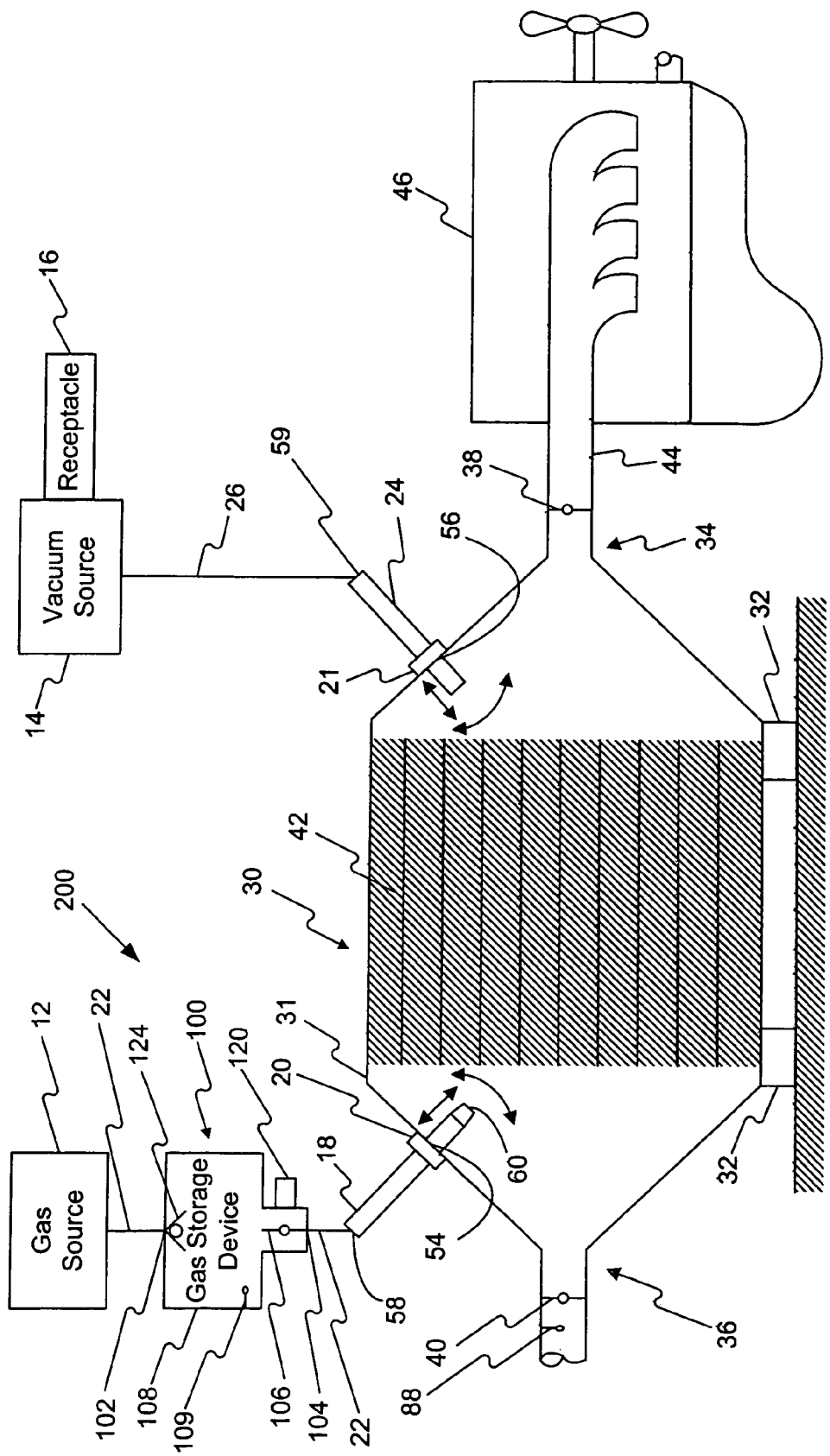
FIG. 8 is a diagrammatic illustration of a service system connected to a filter according to still another exemplary embodiment of the present disclosure.

In a further embodiment of the present disclosure illustrated in FIG. 8, a system 200 for removing matter from a filter 30, or other filtering device known in the art, may include a gas source 12, a vacuum source 14, a receptacle 16, a flow distribution device 18, and a flow receiving device 24. Some components of the system 200 may be fluidly connected to each other by, for example, a gas line 22 or a vacuum line 26. The flow distribution device 18 may be removably attachable to a first orifice 54 of the filter 30 by a boss 20. The flow receiving device 24 may be removably attachable to a second orifice 56 of the filter 30 by a boss 21. The bosses 20, 21 may be any type of bosses known in the art and may have similar mechanical characteristics. The bosses 20, 21 may be attached to a housing 31 of the filter by any conventional means and the location of the bosses 20, 21 correspond to the location of the first and second orifices 54, 56, respectively. The components of the current embodiment may be similar to or the same as the components of other embodiments described above having corresponding reference numbers. For example, the flow distribution device 18 may be a nozzle, the gas source 12 may include a compressor, and the filtering device 30 may be a particulate filter. In addition, the matter removed from the filtering device 30 may be ash resulting from a regeneration of the filtering device 30.

As shown in FIG. 8, the system 200 of the current embodiment may further include a gas storage device 100. The gas storage device 100 may be located downstream of the gas source 12 and an outlet of the gas source 12 may be fluidly connected to a gas storage device inlet 102 by the gas line 22. The gas storage device 100 may be any device capable of storing a pressurized gas. The gas storage device 100 may include, for example, a high pressure gas tank or an expandable storage container. In embodiments where the gas storage device 100 contains a pressurized gas before being fluidly connected to the system 200 of the present disclosure, the gas source 12 may be omitted. The gas storage device 100 may be made of any material known in the art and may be rigid or flexible. Such materials may include, for example, steel, cast iron, copper, aluminum, titanium, platinum, and/or any alloys or combinations thereof. In addition, the gas storage device 100 may also be made from plastic, rubber, vinyl, polytetrafloroethylene, expanded polytetrafloroethylene, or some derivative or combination thereof. In yet another alternative, the gas storage device 100 may be made from a combination of any of the metals and/or non-metals described above.

The gas storage device 100 may have any capacity useful in supplying a controlled volume of high pressure gas to a device such as, for example, a filter. The gas storage device 100 may be capable of storing gas at any desirable pressure relative to atmosphere. For example, in one embodiment of the present disclosure, the gas storage device 100 may be capable of storing pressurized gas in a range that may be safe for servicing filters containing, for example, cordierite plugs. As previously discussed, such plugs, and other like filter media 42, may not be capable of withstanding a pressure of greater than approximately 150 psi without sustaining damage.

The gas storage device 100 may include at least one gas storage device sensor 109 capable of sensing, for example flow, pressure, temperature, or other flow metrics known in the art. The couplings or other means used to fluidly connect the gas storage device 100 to, for example, gas lines 22 may be sized and otherwise designed to form a sealed connection regardless of the gas pressure within the gas storage device 100. The wall thickness of the gas storage device housing 108 may also be appropriate for such pressures. In addition, the gas storage device 100 may be advantageously shaped to store and controllably release a desired volume of pressurized gas. For example, the gas storage device 100 may be cylindrical or spherical to maximize structural integrity.

A gas storage device outlet 104 may be fluidly connected to the flow distribution device inlet 58 by a gas line 22 and a gas storage device valve 106 may be disposed proximate the gas storage device outlet 104. The gas storage device valve 106 may be, for example, a poppet valve, butterfly valve, controllable membrane, or any other type of controllable flow regulation device known in the art. For example, the gas storage device valve 106 may be controlled to allow any range of gas to pass from the gas source 12 to the flow distribution device 18. The gas storage device valve 106 may be positioned to completely restrict a flow of gas from the gas source 12 or may allow the flow to pass unrestricted. The gas storage device valve 106 may be connected to the gas storage device 100 by any conventional means known in the art. In some embodiments the gas storage device valve 106 may be controlled to fully open and/or fully close at relatively high speeds. This high speed movement may be facilitated by a high speed control mechanism 120. The high speed control mechanism 120 may include, for example, an electric, piezoelectric, pneumatic, hydraulic, or other controller. In some embodiments, the high speed control mechanism 120 may be a solenoid, servo motor, or other conventional means.

The gas storage device 100 may also include a check valve 124 disposed proximate the gas storage device inlet 102. The check valve 124 may be configured to permit compressed gas to flow into the gas storage device 100 from the gas source 12 and to prohibit gas from exiting through the gas storage device inlet 102. The check valve 124 may, thus, assist in the storage of pressurized gas within the gas storage device 100.

It is understood that in further embodiments of the present disclosure, various other flow paths may be used to direct a flow from the gas source 12 to the flow distribution device 18. For example, in some embodiments the gas storage device 100 may include a three-way valve (not shown) or other type of valve capable of enabling a user to bypass the gas storage device 100 and to direct a flow of compressed gas from the gas source 12 directly to the flow distribution device inlet 58.

It is also understood that the flow receiving device 24 and the flow distribution device 18 of system 200 (FIG. 8) may be connected in-line with the filter 30 substantially as shown in FIG. 6. In such an embodiment, the inlet 34 of the filter 30 may be disconnected from the exhaust line 44 of the engine 46. The outlet 36 of the filter 30 may also be disconnected from any work machine component to which the outlet 36 may have been attached. The flow receiving device 24 and flow distribution device 18 may then be connected to the inlet 34 and outlet 36 respectively. When so connected, at least a portion of the devices 24, 18 may be within the filter housing 31. Each of the devices 24, 18 may be sealidly connected to the filter 30, and the connection may be substantially air tight. In such an embodiment, the gas source 12 may be fluidly connected to the gas storage device inlet 102 and the gas storage device outlet 104 may be fluidly connected to the flow distribution device inlet 58.

Figure 9:
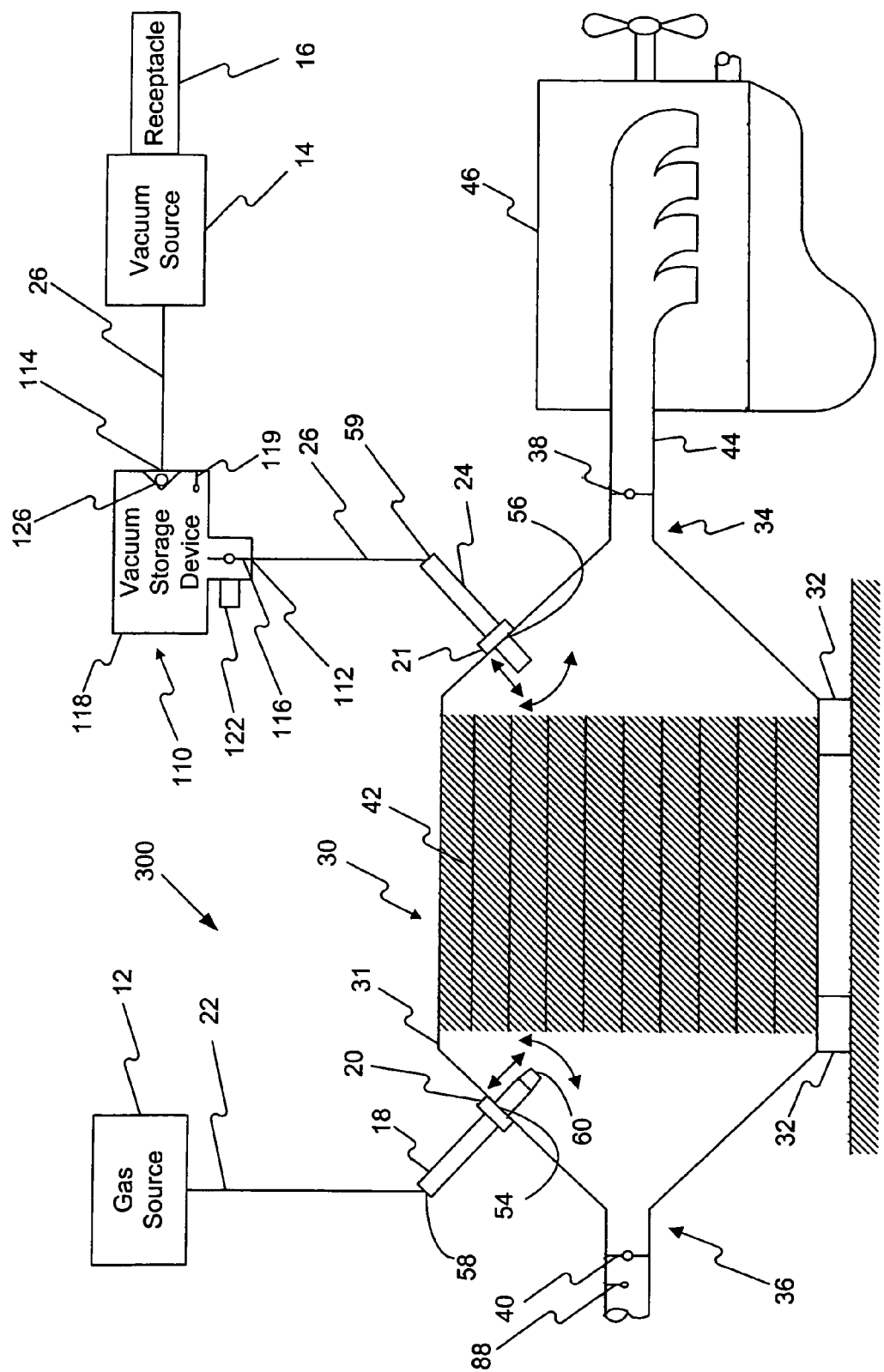
FIG. 9 is a diagrammatic illustration of a service system connected to a filter according to a further exemplary embodiment of the present disclosure.

As shown in FIG. 9, in a further embodiment of the present disclosure, a system 300 for removing matter from a filter 30, or other filtering device known in the art, may include a gas source 12, a vacuum source 14, a receptacle 16, a flow distribution device 18, and a flow receiving device 24. Some components of the system 300 may be fluidly connected to each other by, for example, a gas line 22 or a vacuum line 26. The flow distribution device 18 may be removably attachable to a first orifice 54 of the filter 30 by a boss 20. The flow receiving device 24 may be removably attachable to a second orifice 56 of the filter 30 by a boss 21. As explained with respect to the embodiment of FIG. 8, the components of the exemplary embodiment shown in FIG. 9 may be similar to or the same as the components of other embodiments described above having corresponding reference numbers.

The system 300 of the embodiment illustrated in FIG. 9 may further include a vacuum storage device 110. The vacuum storage device 110 may be located downstream of the vacuum source 14 and an inlet of the vacuum source 14 may be fluidly connected to a vacuum storage device outlet 114 by the vacuum line 26. The vacuum storage device 110 may be any device capable of storing a gas at a negative pressure. The wall thickness of the vacuum storage device housing 118 may be appropriate for such negative pressures. The vacuum storage device 110 may include, for example, a high pressure gas tank and may be made of any material known in the art. The vacuum storage device 110 may have mechanical characteristics similar to the gas storage device 100 of FIG. 8 and in some embodiments, the vacuum storage device 110 may be the same as the gas storage device 100. In embodiments where the vacuum storage device 110 contains a gas at a negative pressure before being fluidly connected to the system 300 of the present disclosure, the vacuum source 14 may be omitted. The vacuum storage device 110 may include at least one vacuum storage device sensor 119 capable of sensing, for example flow, pressure, temperature, or other flow metrics known in the art.

A vacuum storage device inlet 112 may be fluidly connected to the flow receiving device outlet 59 by a vacuum line 26 and a vacuum storage device valve 116 may be disposed proximate the vacuum storage device inlet 112. The vacuum storage device valve 116 may be, for example, a poppet valve, butterfly valve, a controllable membrane, or any other type of controllable flow regulation device known in the art. For example, the vacuum storage device valve 116 may be controlled to allow any range of gas to pass from the flow receiving device 24 to the vacuum storage device 110. The vacuum storage device valve 116 may be positioned to completely restrict a flow of gas from the flow receiving device 24 or may allow the flow to pass unrestricted. The vacuum storage device valve 116 may be connected to the vacuum storage device 110 by any conventional means known in the art. In some embodiments, the vacuum storage device valve 116 may be controlled to fully open and/or fully close at relatively high speeds. This high speed movement may be facilitated by a high speed control mechanism 122. The high speed control mechanism 122 may include, for example, an electric, piezo-electric, pneumatic, hydraulic, or other controller. In some embodiments, the high speed control mechanism 122 may be a servo motor, solenoid, or other conventional means. The vacuum storage device valve 116 and the high speed control mechanism 122 used to control the valve 116 may be mechanically similar to the gas storage device valve 106 and the corresponding high speed control mechanism 120 described above with respect to FIG. 8. In some embodiments, the vacuum storage device valve 116 and the means 122 used to control the valve 116 may be the same as the gas storage device valve 106 and the corresponding high speed control mechanism 120 described above.

The vacuum storage device 110 may further include a check valve 126 disposed proximate the vacuum storage device outlet 114. The check valve 126 may be configured to permit gas to flow to the vacuum source 14 from the vacuum storage device 110, and to prohibit gas from entering the vacuum storage device 110 from the vacuum storage device outlet 114. The check valve 126 may, thus, assist in the storage of gas under a negative pressure within the vacuum storage device 110.

It is understood that in further embodiments of the present disclosure, various other flow paths may be used to direct a flow from the flow receiving device 24 to the vacuum source 14. For example, in some embodiments the vacuum storage device 110 may include a three way valve (not shown). The three-way valve may be similar to or the same as the three-way valve described with respect to the system 200 of FIG. 8.

It is also understood that the flow receiving device 24 and the flow distribution device 18 of system 300 (FIG. 9) may be connected in-line with the filter 30 substantially as shown in FIG. 6. In such an embodiment, the inlet 34 of the filter 30 may be disconnected from the exhaust line 44 of the engine 46. The outlet 36 of the filter 30 may also be disconnected from any work machine component to which the outlet 36 may have been attached. The flow receiving device 24 and flow distribution device 18 may then be connected to the inlet 34 and outlet 36 respectively. When so connected, at least a portion of the devices 24, 18 may be within the filter housing 31. Each of the devices 24, 18 may be sealidly connected to the filter 30, and the connection may be substantially air tight. In such an embodiment, the vacuum source 14 may be fluidly connected to the vacuum storage device outlet 114 and the vacuum storage device inlet 112 may be fluidly connected to the flow receiving device outlet 59.

Figure 9A:
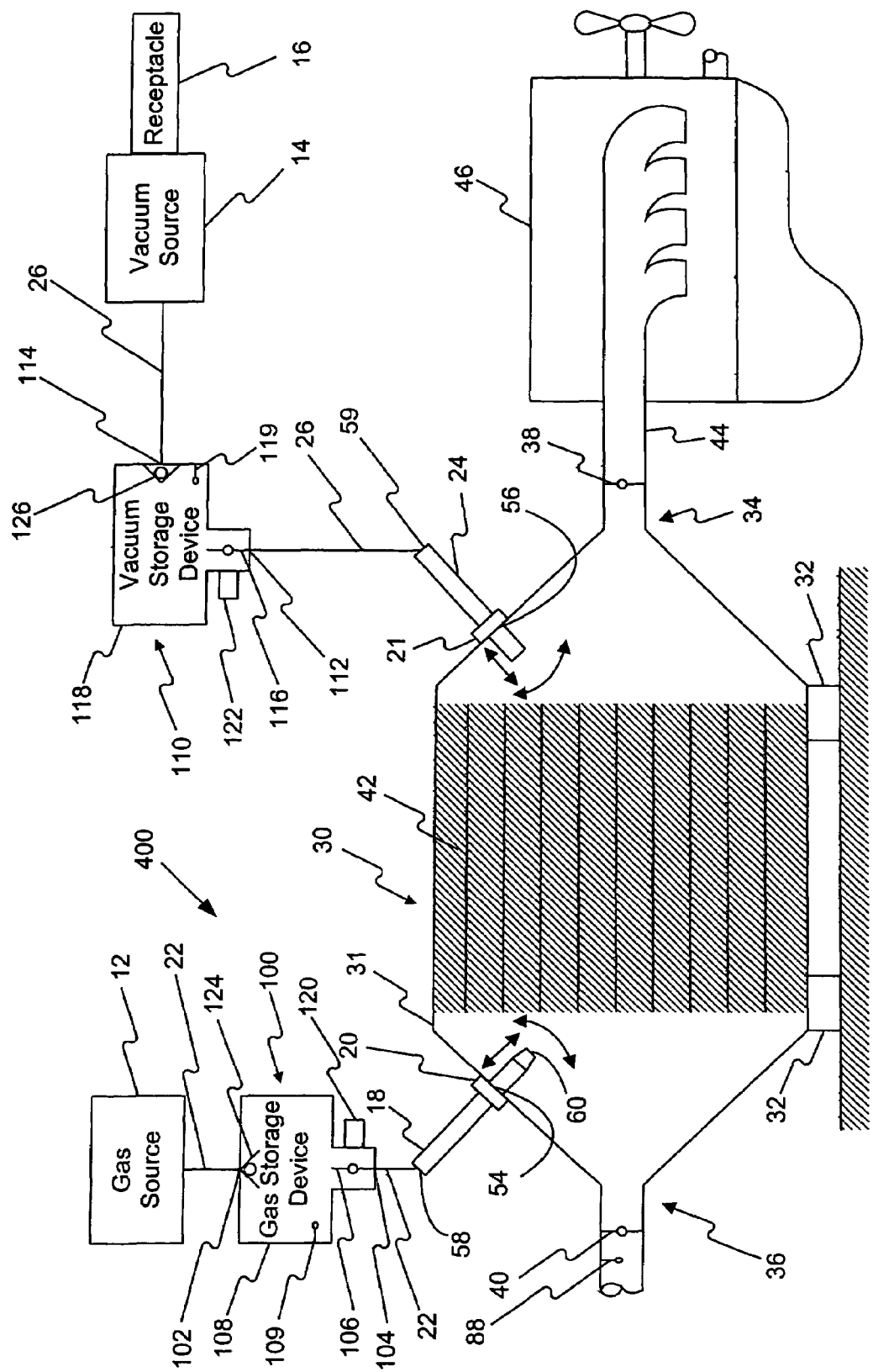
FIG. 9a is a diagrammatic illustration of a service system connected to a filter according to still another exemplary embodiment of the present disclosure.

As shown in FIG. 9a, in an embodiment of the present disclosure, a service system 400 for removing matter from a filter 30, or other filtering device known in the art may include a gas source 12, a vacuum source 14, a receptacle 16, a flow distribution 18, and a flow receiving device 24. Some components of the system 400 may be fluidly connected to each other by, for example, a gas line 22 or a vacuum line 26. The flow distribution device 18 may be removably attachable to a first orifice 54 of the filter 30 by a boss 20. The flow receiving device 24 may be removably attachable to a second orifice 56 of the filter 30 by a boss 21. As explained with respect to the embodiments of FIGS. 8 and 9, the components of the exemplary embodiment shown in FIG. 9a may be similar to or the same as the components of other embodiments described above having corresponding reference numbers.

The system 400 of the embodiment illustrated in FIG. 9a may further include a gas storage device 100 and a vacuum storage device 110. The gas storage device 100 of the system 400 may be similar to or the same as the gas storage device of the system 200 and may include the same components, and be connected in the same way, as described above with respect to FIG. 8. Similarly, vacuum storage device 110 of the system 400 may be similar to or the same as the vacuum storage device 110 of the system 300 and may include the same components, and be connected in the same way, as described above with respect to FIG. 9.

Figure 10:
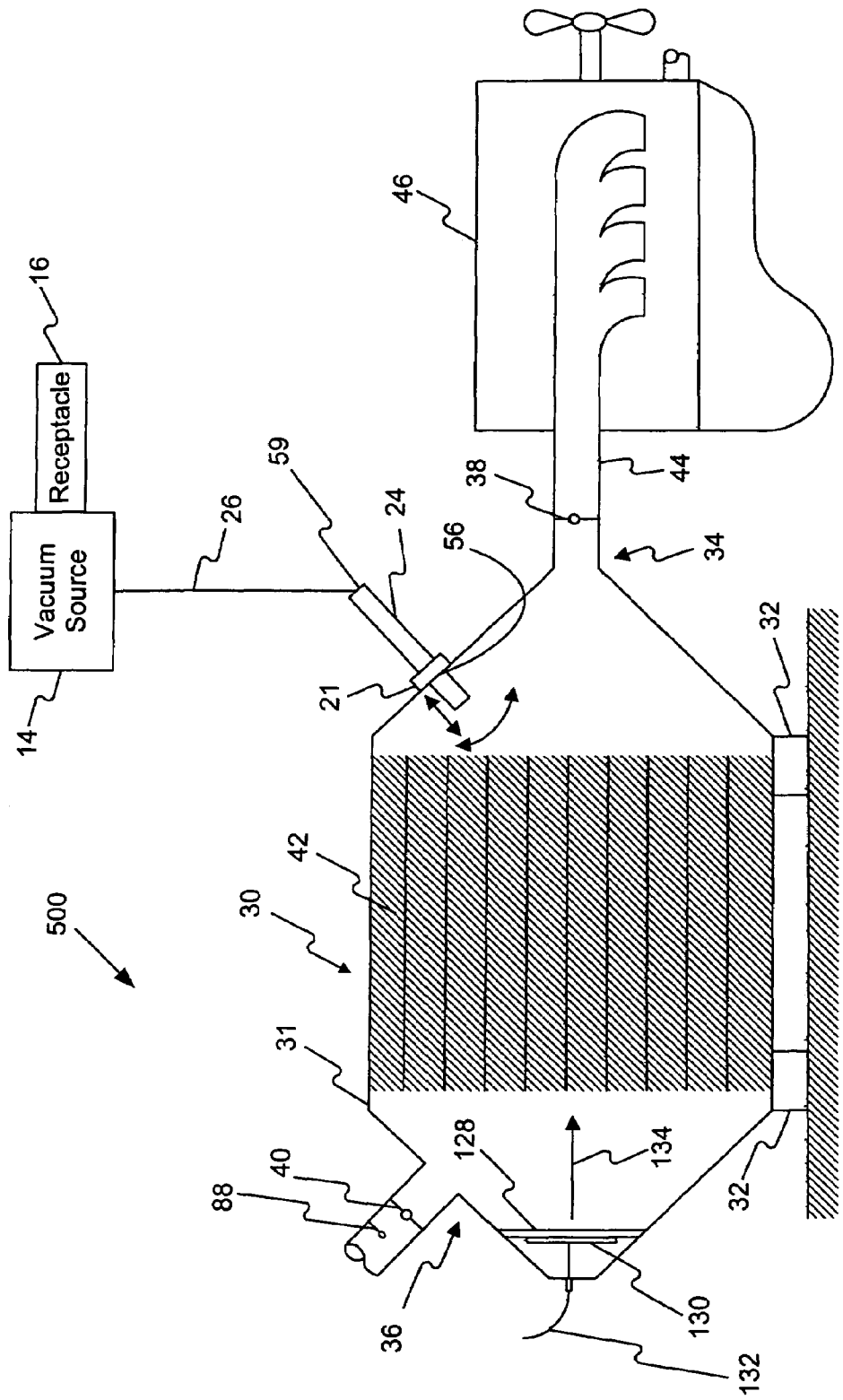
FIG. 10 is a diagrammatic illustration of a service system connected to a filter according to another exemplary embodiment of the present disclosure.

As illustrated in FIG. 10, in a further embodiment of the present disclosure, a service system 500 for removing matter from a filter 30, or other filtering device known in the art, may include a vacuum source 14, a receptacle 16, and a flow receiving device 24. Some components of the system 500 may be fluidly connected to each other by, for example, a vacuum line 26. The flow receiving device 24 may be removably attachable to an orifice 56 of the filter 30 by a boss 21. The components of the exemplary embodiment shown in FIG. 10 may be similar to or the same as the components of other embodiments described above having corresponding reference numbers.

The system 500 of the embodiment illustrated in FIG. 10 may further include an actuator 130 connected to a flexible membrane 128. The membrane 128 may be located downstream of the filter media 42 and may be any type of membrane capable of flexing so as to change the pressure of a gas proximate its surface. The change in pressure created by flexing the membrane 128 may induce a pulse of gas within a device such as, for example, a filter 30. It is understood that in embodiments where the system 500 includes a membrane 128 and an actuator 130, the gas source 12, gas line 22, and the flow distribution device 18 may be omitted.

The membrane 128 may be made from any deformable material known in the art such as, for example, titanium, stainless steel, vinyl, or other metals, polymers, or derivatives thereof. The membrane 128 may be appropriately sized to span at least a portion of a cross-section of the filter 30. In some embodiments, the membrane 128 may span an entire cross-section of the filter 30. The dimensions and configurations of the membrane 128 may be chosen based on the desired change in pressure or the desired characteristics of the gas pulse to be induced within the filter 30. For example, a membrane 128 having a large diameter may be desired in a system 500 requiring a high amplitude gas pulse. In addition, a membrane 128 having a relatively thin profile may be desired in a system 500 requiring a relatively low frequency pulse. As another example, a membrane 128 may be configured similar to a conventional speaker woofer. Such a membrane 128 may have a non-uniform section (not shown) proximate its circumference that may be more flexible than other areas of the membrane 128. This non-uniform section may be substantially rippled similar to, for example, a section of an accordion. Such a non-uniform section may impart additional flexibility to the membrane 128 and may increase the amplitude of the gas pulse that the membrane 128 is capable of inducing. It is understood that these and other membrane characteristics are matters of design choice and that the desired membrane characteristics and configurations may depend upon the configuration of the filter 30 in which the membrane 128 is used.

Figure 11:
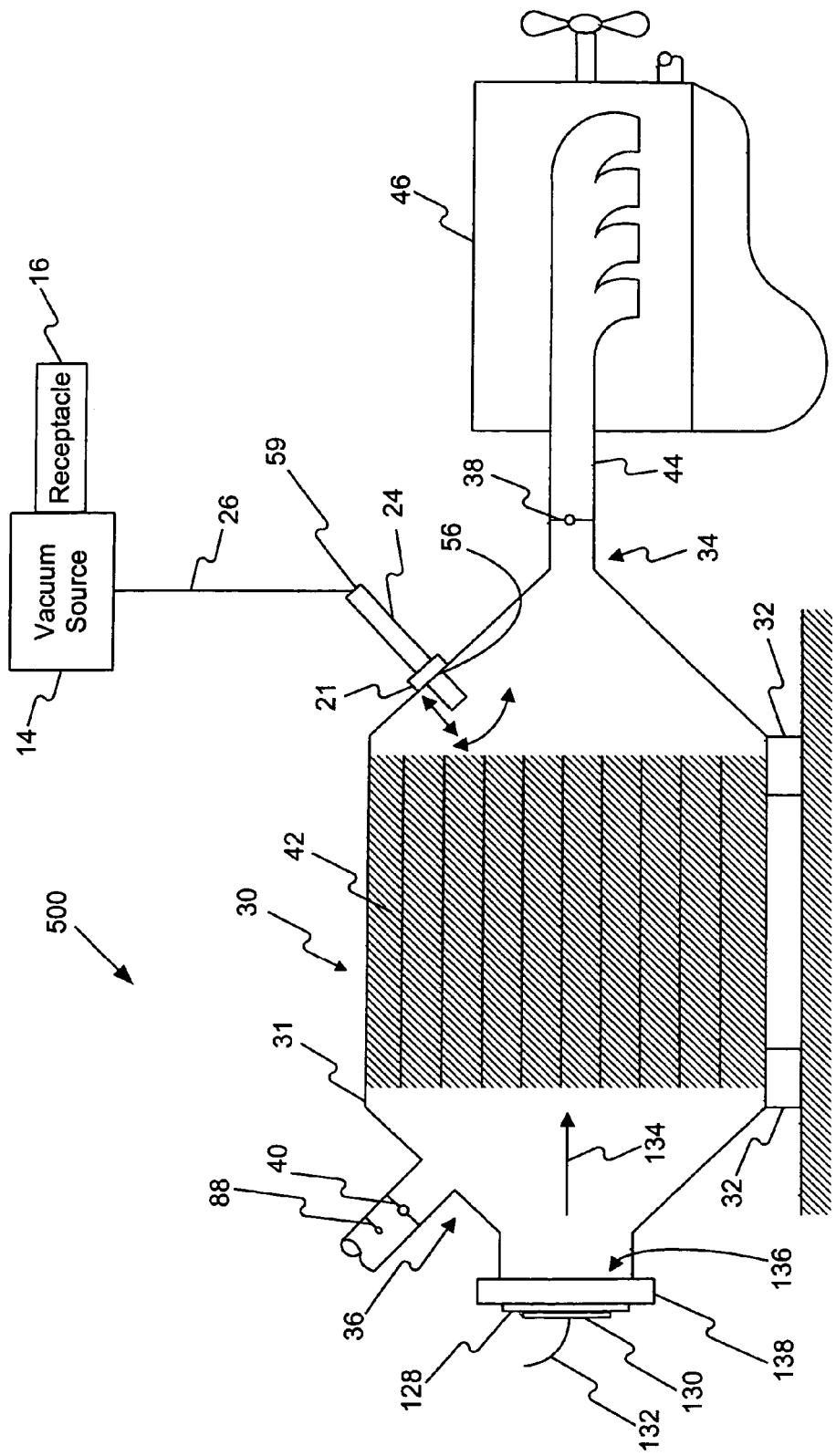
FIG. 11 is a diagrammatic illustration of the service system of FIG. 10 connected to a filter according to yet another exemplary embodiment of the present disclosure.

In some embodiments, the membrane 128 may be rigidly mounted to the housing 31 of the filter 30. The membrane 128 may be mounted by any means known in the art. For example, in some embodiments, the membrane 128 may be welded to the housing 31. The membrane 128 may be mounted or otherwise oriented relative to the filter media 42 so as to direct a pulse of gas in a direction substantially parallel to a normal flow through the filter media 42. This direction is shown by arrow 134 in FIGS. 10 and 11. In some embodiments, the membrane 128 may be mounted substantially parallel to the filter media 42 as shown in FIGS. 10 and 11. The membrane 128 may be positioned within the housing 31 such that the membrane 128 may not interfere with the flow of exhaust through the filter 30 during normal operating condition of the engine 46 (described in greater detail below with respect to FIG. 12). In these embodiments, the membrane 128 may be permanently mounted or otherwise installed within the filter 30 prior to operation of the engine 46 and may remain within the housing 31 of the filter during operation of the engine 46.

In other embodiments, the membrane 128 may be removably attachable to an orifice 136 of the filter 30 by a boss 138. Such an embodiment is illustrated in FIG. 11. The boss 138 may be any type of boss known in the art, and the size and/or type of boss 138 used may be determined by the size and/or type of membrane 128 used. As explained with respect to the embodiment of FIG. 1, the inside diameter of the boss 138 may be threaded. In such embodiments, an outside surface of the membrane 128 may include threads corresponding to those located on the inside diameter of the boss 138 so as to facilitate a connection therebetween.

As shown in FIGS. 10 and 11, the actuator 130 may be rigidly mounted to a surface of the membrane 128 and positioned thereon to assist in changing the pressure of a gas proximate the surface of the membrane 128. The actuator 130 may, thus, be configured to induce a pulse of gas within a device such as, for example, a filter. The actuator 130 may be made of any material known in the art and, in some embodiments of the present disclosure, the actuator 130 may be made of a piezoelectric material. In such embodiments, the actuator 130 may deform when a voltage is applied to the actuator 130. The voltage may be applied through one or more leads 132 electrically connected to the actuator 130. The magnitude of the deformation of the actuator 130 may correspond to the voltage and/or current applied thereto. For example, applying a relatively large voltage to the actuator 130 may cause a relatively large deformation of the actuator 130. The magnitude of the deformation may also be related to the size and/or resistance of the actuator 130. For example, a relatively long actuator 130 may be capable of greater deformation than a similar actuator 130 of shorter length. As discussed above with respect to the membrane 128, the dimensions and characteristics of the actuator 130 may be chosen based on the desired change in pressure or the desired characteristics of the gas pulse to be induced within the filter 30.

Because the actuator 130 is rigidly mounted to the membrane 128, deforming the actuator 130 may cause a corresponding deformation of the membrane 128. Thus, the deformation of the membrane 128, and the corresponding pulse of gas induced within the filter 30, may be controlled by controlling the voltage and/or current supplied to the actuator 130. The deformation of the membrane 128 may be at least partially limited by the rigid connection between the membrane 128 and the housing 31 (FIG. 10) or the boss 138 (FIG. 11).

INDUSTRIAL APPLICABILITY

The disclosed service system 10 may be used with any filter 30, filtering device, or other matter collection device known in the art. Such devices may be used in any application where the removal of matter is desired. For example, such devices may be used on diesel, gasoline, natural gas, or other combustion engines or furnaces known in the art. Thus, as discussed above, the disclosed service system 10 may be used in conjunction with any work machine, on-road vehicle, off-road vehicle, stationary machine, and/or other exhaust producing machines to remove matter from a filtering device thereon. The system 10 may be an on-vehicle or off-vehicle system. In embodiments where the system 10 is an on-vehicle system, components of the system 10 may be mounted directly to the work machine and may be removably attachable to the filtering device. For example, the system 10 could be fixedly secured within a compartment of the work machine, such as the engine compartment.

A variety of different methods and systems may be used to remove matter from the filtering devices of such machines. For example, some filters used in such machines may be cleaned through a regeneration. During regeneration, a heater or some other heat source may be used to increase the temperature of the filter components. The heater may also increase the temperature of trapped particulate matter above its combustion temperature, thereby burning away the collected particulate matter and regenerating the filter while leaving behind a small amount of ash. Although regeneration may reduce the buildup of particulate matter in the filter, repeated regeneration of the filter may result in a build up of ash in the components of the filter over time, and a corresponding deterioration in filter performance.

Unlike particulate matter, ash cannot be burned away through regeneration. Thus, in some situations, it may be necessary to remove built-up ash from an engine filter using other techniques and systems. The operation of the service system 10 will now be explained in detail.

Figure 12:
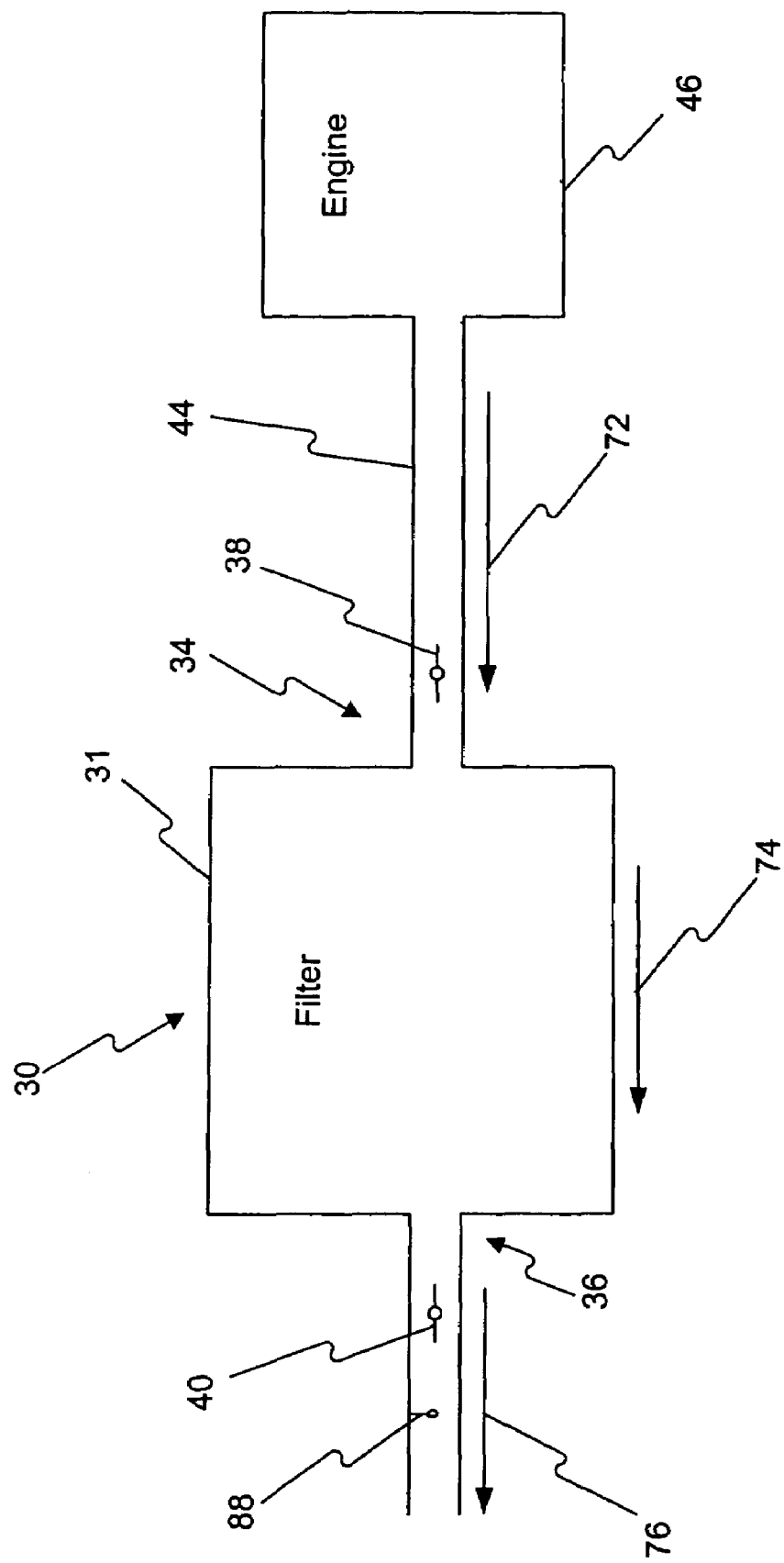
FIG. 12 is a diagrammatic illustration of a filter in an operating flow condition according to an exemplary embodiment of the present disclosure.

FIG. 12 represents a normal operating condition for the engine 46. In this condition, the service system 10 may not be connected to the filter 30, and the inlet valve 38 and outlet valve 40 may both be open to facilitate passage of an exhaust flow from the engine 46. As illustrated by the exhaust flow arrow 72, the exhaust flow may exit the engine 46, and pass through the exhaust line 44 and open inlet valve 38. The exhaust flow may enter the filter 30 through the inlet 34 and may travel across at least a portion of the filter media 42 (not shown) as illustrated by the process flow arrow 74. Upon exiting the filter 30 via the outlet 36, the exhaust flow may pass through open outlet valve 40 as shown by the filtered flow arrow 76.

Over time, the work machine diagnostic devices 88 may sense an increase in the amount of pollutants being released to the atmosphere. Based on these readings, the filter 30 may undergo regeneration either automatically, or as a result of some operator input. As described above, after a number of regeneration cycles ash may begin to build up in the filter media 42. The service system 10 of the present disclosure may be attached to the filter 30 to assist in removing the ash collected therein. It is understood that the system 10 may also be used to assist in the removal of soot and/or other matter collected within the filter 30.

Figure 13:
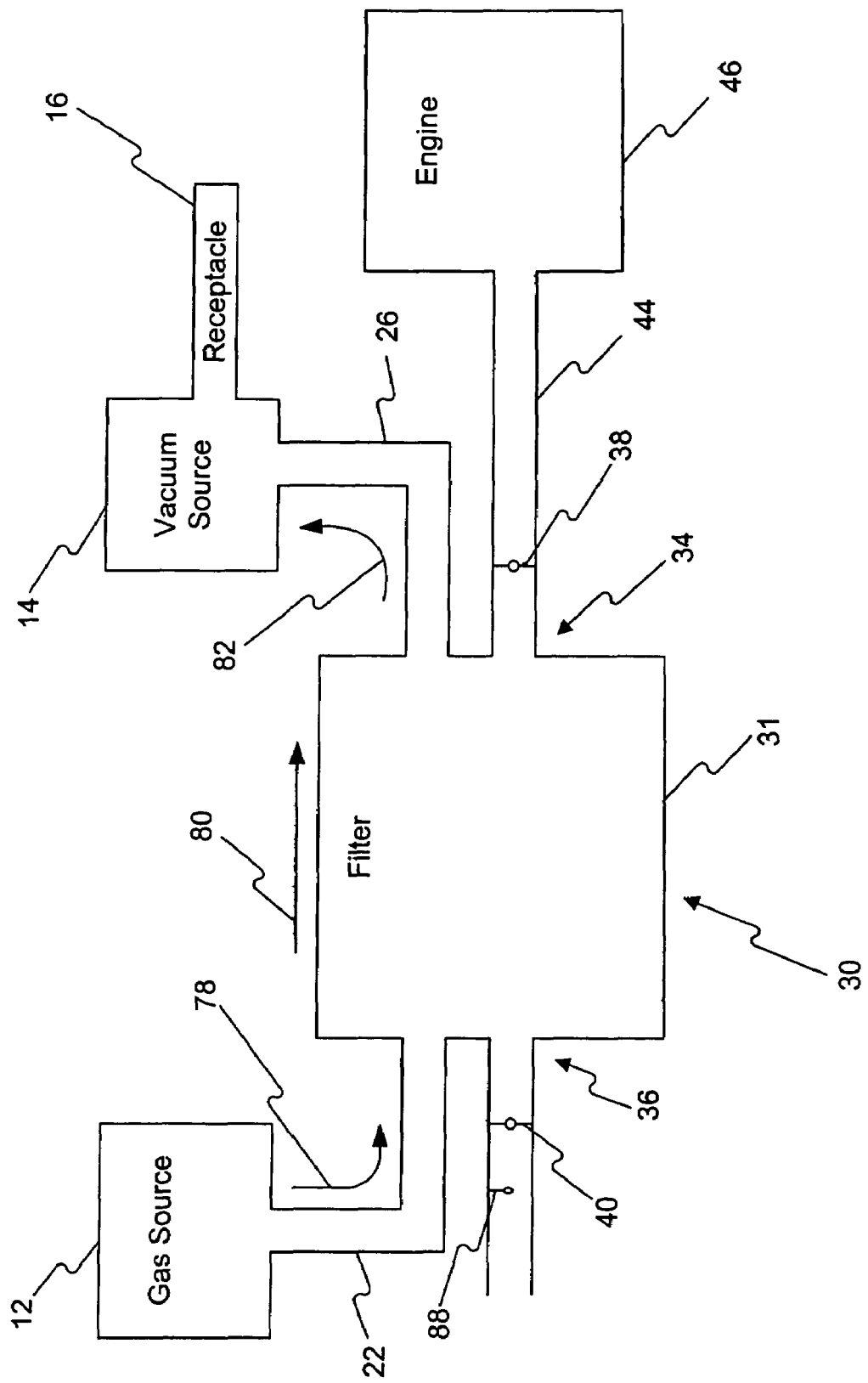
FIG. 13 is a diagrammatic illustration of a service system connected to a filter in a reversed flow arrangement according to an exemplary embodiment of the present disclosure.

As illustrated by FIG. 13, to begin the removal of ash from the filter 30, the engine 46 may be turned off such that combustion ceases and there is no exhaust flow from the engine 46 to the exhaust line 44. The inlet and outlet valves 38, 40 may be manually closed by the user. Alternatively, in an embodiment where the valves 38, 40 may be actuated by a solenoid or other means, the valves 38, 40 may be controlled to close remotely. Closing inlet valve 38 may protect components of the engine 46 during the ash removal process and may prevent ash from entering the engine 46 through exhaust line 44. Closing outlet valve 40 while inlet valve 38 is closed may prevent gas from escaping the filter 30 after being supplied by the flow distribution device 18 (not shown).

The gas source 12 may be attached to the filter 30 by removing the boss cap 48 (FIG. 6) and inserting the flow distribution device 18 (not shown) into the filter housing 31 via boss 20 (FIG. 1). The flow distribution device 18 may be positioned to maximize the flow of compressed air across the filter media 42 without damaging the filter media 42 (see FIG. 1). Damage to the filter media 42 may be prevented by an adjustable stop (not shown) attached to the flow distribution device 18.

The vacuum source 14 may be attached to the filter 30 by removing the boss cap 48 (FIG. 6) on an opposite side of the filter 30 and inserting a flow receiving device 24 into the filter housing 31 via boss 21 (see FIG. 1). The flow receiving device 24 may be inserted into the filter 30 and may be positioned to maximize the amount of vacuum or negative pressure supplied to the filter media 42 without damaging the filter media 42.

The gas source 12 may be activated and may begin to supply compressed air to the filter 30 as shown by compressed flow arrow 78. Although this flow is shown schematically in FIG. 13, it is understood that compressed air may be supplied by the flow distribution device 18 to obtain maximum air distribution across the filter media 42. This distribution of compressed air may be the result of the design of the flow distribution device 18, such as the hole pattern, manual or mechanical actuation, free movement, or a combination thereof. It is understood that while compressed air is being supplied by the gas source 12, the flow distribution device 18 may be manipulated by the user to direct the distribution of compressed air within the filter 30 and to improve the system's ash removal capabilities. For example, the devices 18, 24 of FIG. 1*a* may be manipulated substantially up and down along the filter media 42 as shown by the directional arrows. The devices 18, 24 of FIG. 1*b* may be manipulated in substantially the same manner. As illustrated in FIGS. 1, 1*a*, and 1*b*, such manipulation may depend in part on the types of devices 18, 24 and/or end effectors 90*a*, 92*a*, 90*b*, 92*b* utilized. While the devices 18, 24 of FIG. 1 may be manipulated in virtually any direction to improve the distribution of air, the devices 18, 24 of FIGS. 1*a* and 1*b* may be partially limited in their range of motion due to at least the size and shape of the end effectors 90*a*, 92*a* and 90*b*, 92*b*, respectively.

The vacuum source 14 may be activated at substantially the same time as the gas source 12, and may supply a vacuum or negative pressure to the filter 30 while the gas source 12 supplies compressed air. The gas source 12 and the vacuum source 14 may force air through the filter 30 in a direction opposite the direction of exhaust flow during normal filter operating conditions (FIG. 12). The combination of compressed air and vacuum may improve the ash removal capabilities of the service system 10 and may be useful in removing ash lodged deep within the filter media 42 of the filter 30. This air flow is illustrated by reverse flow arrow 80 in FIG. 13.

In some embodiments, the volume of compressed air supplied by the gas source 12 may substantially coincide with the volume of gas removed by the vacuum source 14. In other embodiments, however, the output of the gas source 12 may not be related to the input of the vacuum source 14. It is understood that in embodiments where the input of the vacuum source 14 and the output of the gas source 12 are not calibrated to be substantially equivalent, the overall efficiency of the service system 10 may not be maximized.

Once ash is broken free, it may be carried into the vacuum source 14 as shown by vacuum flow arrow 82 and/or into the receptacle 16. The ash may be safely stored in the receptacle 16 throughout the ash removal process, and may reside in the receptacle 16 until disposed of.

It is understood that based on the size, shape, and/or location of the flow receiving device 24, the device may not be capable of collecting all of the ash removed from the filter 30. For example, due to the reverse flow created within the filter, some of the removed ash may relocate adjacent to the flow receiving device 24. Regardless of the flow receiving device's movablility within the filter housing 31, the device 24 may not be capable of reaching such removed ash. It is also understood that in order to alleviate this problem, the size of the second orifice 56 may be increased to allow for improved movability. In addition, a larger or funnel-shaped flow receiving device 24 may be used. Each of these solutions, however, may result in other undesirable inefficiencies.

The user may determine whether the filter 30 is substantially free of ash by using existing work machine diagnostic devices 88, or other means known in the art. For example, after forcing a reversed flow of compressed air through the filter 30, the user may disconnect the service system 10, open the inlet and outlet valves, 38, 40, and start the engine 46. Work machine diagnostic devices 88 downstream of the filter 30 may determine whether the filter 30 is operating under substantially ash-free conditions or whether the filter 30 requires further service.

Figure 14:
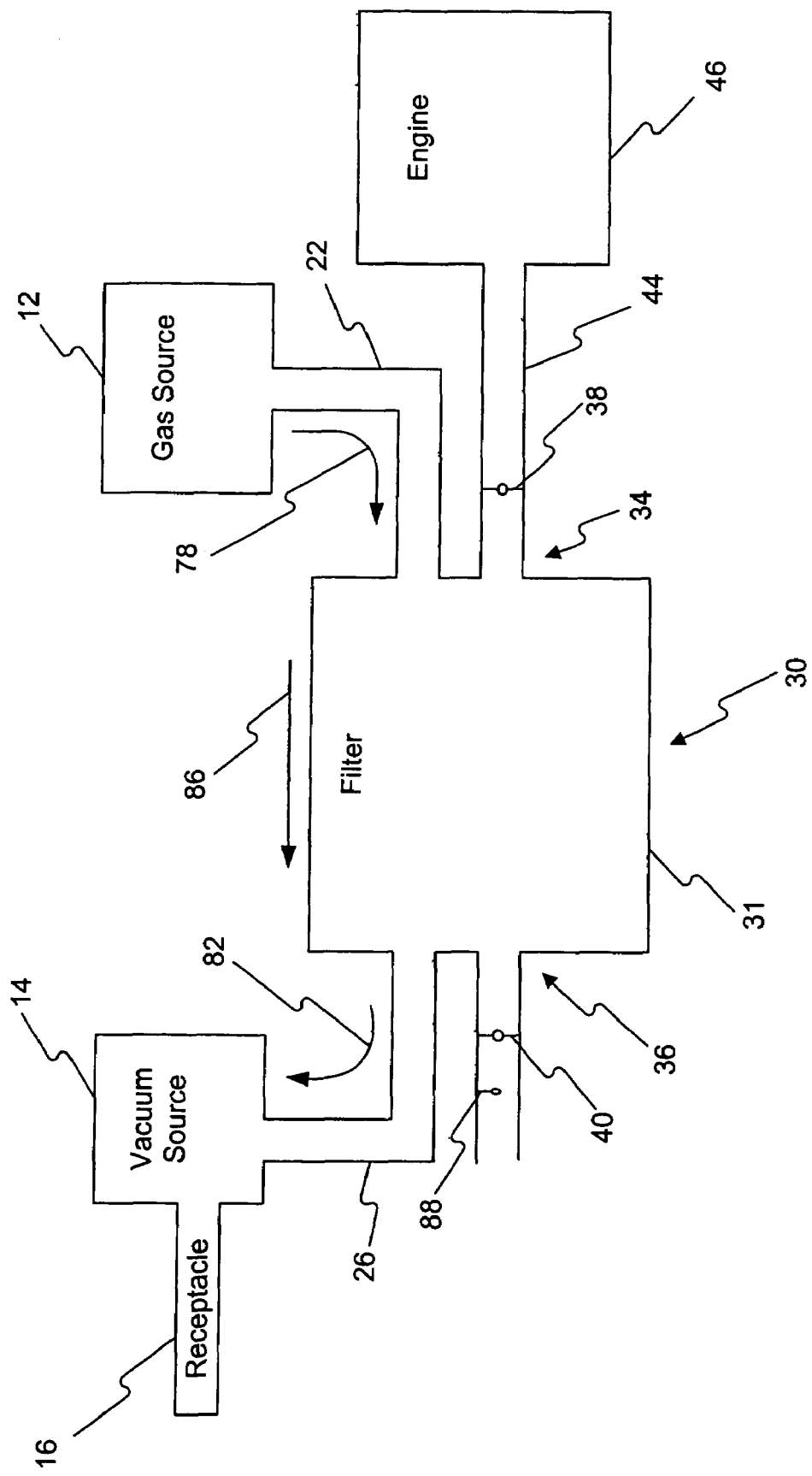
FIG. 14 is a diagrammatic illustration of a service system connected to a filter in a normal flow arrangement according to an exemplary embodiment of the present disclosure.

In some situations, a substantial portion of ash may remain within the filter 30 after the gas source 12 and the vacuum source 14 have acted on the filter media 42 in a reverse flow condition. In such situations, it may be necessary to utilize the gas source 12 and the vacuum source 14 to force air through the filter 30 in a in a normal flow direction as illustrated in FIG. 14. As shown, the gas source 12 may force compressed air in the direction of compressed flow arrow 78. The compressed air may be dispersed across the face of the filter media 42 by the flow distribution device 18 (not shown) and carried through the filter 30 in the direction of normal flow arrow 86. The remaining ash may be dislodged from the filter media 42 and may be removed from the filter 30. As shown by vacuum flow arrow 82, the ash may travel to the vacuum source 14 and into the receptacle 16 where it may be safely stored. The inlet and outlet valves 38, 40 may be closed throughout this process to protect the engine 46 from damage and to maintain pressure within the filter 30. After this normal flow direction cleaning cycle, the user may again disconnect the service system 10 from the filter 30 and measure the performance of the filter 30 using one or more of the work machine diagnostic devices 88 discussed above. This process may be repeated until filter performance returns to satisfactory levels.

Furthermore, in an embodiment where the system 200 further includes a gas storage device 100 (FIG. 8), the gas storage device valve 106 may be closed while the gas source 12 is activated. Closing the gas storage device valve 106 may completely restrict the flow of compressed air from passing to the flow distribution device 18 and may allow for at least a portion of the flow of compressed air to be stored within the gas storage device 100. Pressure may increase within the gas storage device 100 as the portion of the flow is stored therein. The check valve 124 may prevent pressurized gas from exiting through the gas storage device inlet 102 and may, thus, assist in storing gas at a positive pressure. Once a desired positive pressure within the gas storage device 100 has been reached, the gas storage device valve 106 may be opened and the stored gas may be released to the flow distribution device 18 through the gas storage device outlet 104. The gas storage device valve 106 may be opened rapidly to maximize the force with which the stored air is released from the gas storage device 100. The released gas may create a shockwave of compressed gas across the filter media 42 and may improve the matter removal capabilities of the system 200. For instance, a shockwave of gas may be capable of removing matter deep within the filter media 42 in less time and with less effort than a system 10 where a shockwave is not utilized. As described above, the stored flow of gas may be supplied in a direction opposite from the direction of normal flow through the filtering device 30. It is understood that the vacuum source 14 of system 200 may be activated before, or at substantially the same time, the valve 106 is opened.

In an embodiment where the system 300 includes a vacuum storage device 110 (FIG. 9), the vacuum storage device valve 116 may be closed while the vacuum source 14 is activated. Closing the vacuum storage device valve 116 may completely restrict the flow of air from passing to the vacuum storage device 110 from the filter 30 and may allow a negative pressure to build up within the vacuum storage device 110. Pressure may decrease within the vacuum storage device 110 as flow is restricted by the vacuum storage device valve 116 and the vacuum source continues to pull a vacuum. The check valve 126 may prevent gas from entering the vacuum storage device outlet 114 and may, thus, assist in storing gas at a negative pressure. Once a desired negative pressure within the vacuum storage device 110 has been reached, the vacuum storage device valve 116 may be opened and the built up negative pressure within the vacuum storage device 110 may rapidly draw a flow of gas from the filter 30 through the flow receiving device 24. The vacuum storage device valve 116 may be opened rapidly to maximize the force with which gas is drawn into the vacuum storage device 110. The use of a vacuum storage device 110 to build up and release a negative pressure downstream of the filter media 42 may improve the matter removal capabilities of the system 300. For instance, rapidly releasing a built up vacuum within a closed system, such as the system 300 of FIG. 9, may assist in removing matter deep within the filter media 42 in less time and with less effort than a system 10 where a build up of negative pressure does not exist. As explained above, the negative pressure may be supplied to at least a portion of the filtering device 30 in a direction opposite from the direction of normal flow through the filtering device 30. It is understood that the gas source 12 of system 300 may be activated before, or at substantially the same time, the valve 116 is opened.

As shown in FIG. 9a, in a further embodiment the system 400 may include both a gas storage device 100 and a vacuum storage device 110. In such an embodiment, the vacuum storage device valve 116 and the gas storage device valve 106 may be closed while the vacuum source 14 and the gas source 12 are activated, respectively. As described above, closing the valves 116, 106 in this way may restrict flows of air from passing to the vacuum storage device 110 and to the flow distribution device 18. Closing the valves 116, 106 may also allow a negative pressure to build up within the vacuum storage device 110 and a positive pressure to build up in the gas storage device 100. Once desired pressures within the vacuum storage device 110 and the gas storage device 100 have been reached, the valves 116, 106 may be opened. As described above, opening the vacuum storage valve 116 may rapidly draw a flow of gas from the filter 30 through the flow receiving device 24. Similarly, opening the gas storage device valve 106 may release stored gas to the flow distribution device 18. The valves 116, 106 may be opened rapidly and may be opened substantially in unison to improve the matter removal capabilities of the system 400.

In an embodiment in which the system 500 (FIGS. 10 and 11) includes a membrane 128 and an actuator 130, both the outlet and inlet valves 40, 38 may be closed to create a relatively closed system within the housing 31 of the filter 30. The membrane 128 may be removably attached to the housing 31 by a boss 138 connected to an orifice 136 of the filter 30. A voltage may then be supplied to the actuator 130 through the lead 132 to deform the membrane 128. This deformation causes a change in pressure and a corresponding pulse of gas within the filter 30 in a direction opposite the direction of normal flow. This direction is illustrated by arrow 38 in FIGS. 10 and 11. The amplitude and frequency of the gas pulses are controlled by varying the voltage supplied to the actuator 130 and may be selected to induce gas pulses capable of removing mater collected within the filter media 42. The vacuum source 14 may also be activated to assist in the removal of matter from the filter 30 while the gas pulses are being supplied. As explained above with respect to FIG. 10, in some embodiments, the membrane 128 may be mounted within the filter 30 and may not be removable.

Other embodiments of the disclosed service system 10 will be apparent to those skilled in the art from consideration of the specification. For example, the inlet and outlet valves 38, 40 may be three-way valves, and may be capable of directing an exhaust flow of the engine 46 in an alternate path while the filter 30 is being serviced. In addition, the filter 30 may be fitted with more than two bosses 20, 21 to facilitate insertion of more than one flow distribution device 18 and/or more than one flow receiving device 24. Furthermore, the gas source 12 and the vacuum source 14 may be the same device.

In addition, in some embodiments, the vacuum storage device 118 may be used in conjunction with the membrane 128 and the actuator 130 to assist in removing matter from the filter 30. Moreover, the service system 10 may include at least one sensor for sensing a characteristic of a flow through the filter 30. The sensor may be connected to a service system controller. The controller may control aspects of the ash removal process in response to signals received from the at least one sensor. To facilitate this control, the inlet and outlet valves 38, 40, the gas source 12, and/or the vacuum source 14 may be controllably connected to the controller. It is intended that the specification and examples be considered as exemplary only, with the true scope of the invention being indicated by the following claims.

What is claimed is:

1. A system for removing matter from a filtering device, comprising:
   a gas pressurization assembly configured to selectively deliver a flow of pressurized gas to a desired portion of the filtering device, an element of the assembly being removably attachable to a first orifice of the filtering device,
   and an inlet valve disposed proximate an inlet of the filtering device.

2. The system of claim 1, wherein the gas pressurization assembly includes a flow distribution device fluidly connected to a gas source.

3. The system of claim 2, wherein a component of the flow distribution device is rotatably movable within the filtering device.

4. The system of claim 2, wherein at least a portion of the flow distribution device is fixed relative to the filtering device.

5. The system of claim 2, wherein the flow distribution device includes a portion configured to change the direction of a flow through the filtering device.

6. The system of claim 2, wherein the gas source includes a compressor.

7. The system of claim 2, further including a gas storage device coupled to the gas source, the gas storage device being controllably fluidly connectable to the first orifice of the filtering device.

8. The system of claim 7, further including a gas storage valve disposed between the gas storage device and the filtering device, wherein the gas storage valve is controlled by an electrically controlled actuator.

9. The system of claim 8, wherein the electrically controlled actuator comprises a piezoelectric material.

10. The system of claim 8, wherein the gas storage valve is a membrane valve.

11. The system of claim 8, wherein the gas storage valve is disposed proximate an outlet of the gas storage device.

12. The system of claim 7, further including at least one sensor configured to sense at least one of pressure, flow, or temperature within the gas storage device.

13. The system of claim 7, wherein the gas storage device includes a high pressure gas tank.

14. The system of claim 13, wherein the high pressure gas tank is configured to store gas at a pressure in excess of 70 psi.

15. The system of claim 2, further including an actuation device connected to the flow distribution device.

16. The system of claim 15, wherein the actuation device imparts rotational movement to the flow distribution device relative to a substrate of the filtering device.

17. The system of claim 2, wherein the flow distribution device has a surface that is substantially the same shape as a face of a substrate disposed within the filtering device.

18. The system of claim 17, wherein the surface of the flow distribution device is substantially circular.

19. The system of claim 1, further including an outlet valve disposed proximate an outlet of the filtering device.

20. The system of claim 1, further including a receptacle configured to collect at least a portion of the matter removed by the system.

21. The system of claim 1, wherein the filtering device is a particulate filter.

22. The system of claim 1, wherein the desired portion of the filtering device is less than an entire cross section of a substrate disposed within the filtering device.

23. The system of claim 1, wherein the desired portion of the filtering device is less than half of a cross-section of a substrate disposed within the filtering device.

24. The system of claim 1, wherein an element of the gas pressurization assembly is configured to prohibit flow from passing through a section of the filtering device.

25. The system of claim 1, wherein the gas pressurization assembly further includes a component configured to fluidly block a portion of face of a substrate disposed within the filtering device.

26. The system of claim 1, wherein the flow of pressurized gas is an unheated flow.

27. A method of removing matter from a filtering device, comprising:
    connecting a gas pressurization assembly to a first orifice of the filtering device;
    selectively delivering a flow of pressurized gas through a controllable membrane valve to a desired portion of the filtering device with the gas pressurization assembly via a funnel-shaped element; and
    controlling an inlet valve disposed proximate an inlet of the filtering device.

28. The method of claim 27, further including storing a gas at a positive pressure in a gas storage device fluidly connected to the gas source.

29. The method of claim 28, further including controllably fluidly coupling the gas storage device to the filtering device so as to release the stored gas from the gas storage device via the controllable membrane valve.

30. The method of claim 29, further including controlling a flow of gas across at least a portion of the filtering device in a direction opposite from the direction of normal flow through the filtering device.

31. The method of claim 28, wherein the gas storage device is removably coupled to the filtering device.

32. The method of claim 27, wherein connecting a gas pressurization assembly includes attaching an actuation device to the filtering device.

33. The method of claim 32, wherein the actuation device is configured to impart rotational movement to a flow distribution device of the gas pressurization assembly.

34. The method of claim 27, wherein the desired portion of the filtering device is less than an entire cross section of a substrate disposed within the filtering device.

35. The method of claim 27, wherein the desired portion of the filtering device is less than half of a cross section of a substrate disposed within the filtering device.

36. The method of claim 27, wherein an element of the gas pressurization assembly is configured to prohibit flow from passing through a section of the filtering device.

37. The method of claim 27, wherein the gas pressurization assembly further includes a component configured to fluidly block a portion of face of a substrate disposed within the filtering device.

38. The method of claim 27, wherein the flow of pressurized gas is an unheated flow.

39. The method of claim 27, wherein the gas pressurization assembly further includes a flow distribution device.

40. The method of claim 27, wherein an element of the gas pressurization assembly is removably attachable to the filtering device.

41. A system for removing matter from a filtering device, comprising:
    a gas pressurization assembly, an element of the assembly being removably attachable to a first orifice of the filtering device, the gas pressurization assembly being configured to deliver a flow of pressurized gas through a controllable membrane valve to the first orifice and through a funnel-shaped element to restrict the flow of pressurized gas to a desired portion of the filtering; and
    and an inlet valve disposed proximate an inlet of the filtering device.

42. The system of claim 41, wherein the element of the assembly includes an actuation device.

43. The system of claim 42, further including a flow distribution device connected to the actuation device.

44. The system of claim 43, wherein the actuation device is configured to rotate the flow distribution device relative to a substrate of the filtering device.

45. The system of claim 41, wherein the desired portion of the filtering device is less than an entire cross section of a substrate disposed within the filtering device.

46. The system of claim 41, wherein the desired portion of the filtering device is less than half of a cross section of a substrate disposed within the filtering device.

47. The system of claim 41, wherein the gas pressurization assembly further includes a component configured to fluidly block a portion of face of a substrate disposed within the filtering device.

48. The system of claim 41, wherein the flow of pressurized gas is an unheated flow.

49. A method of removing matter from a filtering device, comprising:
- removably attaching a gas pressurization assembly to a first orifice of the filtering device;
- delivering a flow of pressurized gas through a controllable membrane valve to the first orifice of the filtering device via a funnel-shaped element;
- controlling an inlet valve disposed proximate an inlet of the filtering device; and
- restricting the flow of pressurized gas to a desired portion of the filtering device.

50. The method of claim 49, further including rotating an element of the gas pressurization assembly relative to a substrate of the filtering device.

51. The method of claim 49, wherein the desired portion of the filtering device is less than an entire cross section of a substrate disposed within the filtering device.

52. The method of claim 49, wherein the desired portion of the filtering device is less than half of a cross section of a substrate disposed within the filtering device.

53. The method of claim 49, further including fluidly blocking a portion of face of a substrate disposed within the filtering device.

54. The method of claim 49, wherein the flow of pressurized gas is an unheated flow.

* * * * *